US00RE42638E

(19) United States
(12) Reissued Patent
Ray et al.

(10) Patent Number: US RE42,638 E
(45) Date of Reissued Patent: Aug. 23, 2011

(54) RESAMPLE AND COMPOSITE ENGINE FOR REAL-TIME VOLUME RENDERING

(75) Inventors: Harvey Ray, Longmont, CO (US); Deborah Silver, East Brunswick, NJ (US)

(73) Assignee: Rutgers, The State University of New JerseyNJ (US)

(21) Appl. No.: 11/305,902

(22) Filed: Dec. 16, 2005 (Under 37 CFR 1.47)

Related U.S. Patent Documents

Reissue of:
(64) Patent No.: 6,664,961
Issued: Dec. 16, 2003
Appl. No.: 09/741,558
Filed: Dec. 20, 2000

(51) Int. Cl.
*G06T 15/00* (2006.01)

(52) U.S. Cl. ..... 345/424; 345/426; 345/505

(58) Field of Classification Search ..... 345/421, 345/424, 426, 619, 505
See application file for complete search history.

(56) References Cited

U.S. PATENT DOCUMENTS

| | | | | |
|---|---|---|---|---|
| 5,113,357 | A | 5/1992 | Johnson et al. | |
| 5,499,323 | A | 3/1996 | Doi et al. | |
| 5,557,734 | A | 9/1996 | Wilson | |
| 5,594,842 | A | 1/1997 | Kaufman et al. | |
| 5,847,711 | A | 12/1998 | Kaufman et al. | |
| 5,861,891 | A | 1/1999 | Becker | |
| 5,917,937 | A | 6/1999 | Szeliski et al. | |
| 6,008,813 | A | 12/1999 | Lauer et al. | |
| 6,034,697 | A | 3/2000 | Becker | |
| 6,078,332 | A | 6/2000 | Ohazama | |
| 6,111,582 | A | 8/2000 | Jenkins | |
| 6,304,266 | B1 | 10/2001 | Li | |
| 6,310,620 | B1 | 10/2001 | Lauer et al. | |
| 6,456,285 | B2 * | 9/2002 | Hayhurst | 345/422 |
| 6,636,215 | B1 * | 10/2003 | Greene | 345/422 |
| 6,826,297 | B2 * | 11/2004 | Saito et al. | 382/131 |
| 7,136,064 | B2 * | 11/2006 | Zuiderveld | 345/424 |
| 7,167,181 | B2 * | 1/2007 | Duluk et al. | 345/506 |
| 7,362,329 | B2 * | 4/2008 | Zuiderveld | 345/424 |

OTHER PUBLICATIONS

Yagel, R., et al: "Accelerating Volume Animation by Space-Leaping", Proceedings of the Conference on Visualization, San Jose, Oct. 25-29, 1993, New York, IEEE, US, Oct. 25, 1993, pp. 62-69, XP000475412.

Hirai, T., et al: "Hybrid Volume Ray Tracing of Multiple Isosurfaces with Arbitrary Opacity Values", IEICE Transactions on Information and Systems, Institute of Electronics Information and Comm. Eng. Tokyo, JP, vol. E79-D, No. 7, Jul. 1, 1996, pp. 965-972, XP000628406.

Mueller, K., et al: "Fast Perspective Volume Rendering with Splatting by Utilizing a Ray-Driven Approach", Visualization '96. Proceedings of the Visualization Conference, San Francisco, Oct. 27-Nov. 1, 1996, Proceedings of the Visualization Conference, New York, IEEE/ACM, US, Oct. 27, 1996, pp. 65-72, XP000704171.

(Continued)

*Primary Examiner* — Phu Nguyen

(57) ABSTRACT

The present invention is a digital electronic system for rendering a volume image in real time. The system accelerators the processing of voxels through early ray termination and space leaping techniques in the projection guided ray casting of the voxels. Predictable and regular voxel access from high-speed internal memory further accelerates the volume rendering. Through the acceleration techniques and devices of the present invention real-time rendering of parallel and perspective views, including those for stereoscopic viewing, are achieved.

91 Claims, 9 Drawing Sheets

OTHER PUBLICATIONS

Ray, H., et al: "Ray Casting Architectures for Volume Visualization", IEEE Transactions on Visualization and Computer Graphics, IEEE Service Center, Piscataway, NJ, US, vol. 5, No. 3, Jul. 1999, pp. 210-223, XP000865305.

* cited by examiner

RESAMPLE AND COMPOSITE ENGINE FOR REAL-TIME VOLUME RENDERING

Matter enclosed in heavy brackets [ ] appears in the original patent but forms no part of this reissue specification; matter printed in italics indicates the additions made by reissue.

FIELD OF THE INVENTION

The present invention is a system for providing three-dimensional computer graphics. More particularly, the present invention is a system that accelerates the processing of volume data for real-time ray casting of a three-dimensional image and a method thereof.

BACKGROUND OF THE INVENTION

Volume rendering projects a volume dataset onto a two-dimensional (2D) image plane or frame-buffer. Volume rendering can be used to view and analyze three-dimensional (3D) data from various disciplines, such as biomedicine, geophysics, computational fluid dynamics, finite element models and computerized chemistry. Volume rendering is also useful in the application of 3D graphics, such as Virtual Reality (VR), Computer Aided Design (CAD), computer games, computer graphics special effects and the like. The various applications, however, may use a variety of terms, such as 3D datasets, 3D images, volume images, stacks of 2D images and the like, to describe volume datasets.

As schematically depicted in FIG. 1, a volume dataset is typically organized as a 3D array of samples which are often referred to as volume elements or voxels. The volume dataset can vary in size, for example from $128^3$ to $1024^3$ samples, and may also be non-symmetric, i.e., 512×512×128. The samples or voxels can also vary in size. For example, a voxel can be any useful number of bits, for instance 8 bits, 16 bits, 24 bits, 32 bits or larger, and the like.

The volume dataset can be thought of as planes of voxels or slices. Each slice is composed of rows or columns of voxels or beams. As depicted in FIG. 1, the voxels are uniform in size and regularly spaced on a rectilinear grid. Volume datasets can also be classified into non-rectilinear grids, for example curvilinear grids. These other types of grids can be mapped onto regular grids.

Voxels may also represent various physical characteristics, such as density, temperature, velocity, pressure and color. Measurements, such as area and volume, can be extracted from the volume datasets. A volume dataset may often contain more than a hundred million voxels thereby requiring a large amount of storage. Because of the vast amount of information contained in a dataset, interactive volume rendering or real-time volume rendering defined below requires a large amount of memory bandwidth and computational throughput. These requirements often exceed the performance provided by typical modern workstations and personal computers.

Volume rendering techniques include direct and indirect volume rendering. Direct volume rendering projects the entire dataset onto an image-plane or frame buffer. Indirect volume rendering extracts surfaces from the dataset in an intermediate step, and these projected surfaces are approximated by triangles and rendered using the conventional graphics hardware. Indirect volume rendering, however, only allows a viewer to observe a limited number of values in the dataset (typically 1-2) as compared to or all of the data values contained therein for direct volume rendering.

Direct volume rendering that is implemented in software, however, is typically very slow because of the vast amount of data to be processed. Moreover, real-time direct (interactive) volume rendering (RTDVR) involves rendering the entire dataset at over 10 Hz, however, 30 Hz or higher is desirable. Recently, RTDVR architectures have become available for the personal computer, such as VolumePro, which is commercially available from RTVIZ, a subsidiary of Mitsubishi Electronic Research Laboratory. VIZARD II and VG-Engine are two other RTDVR accelerators that are anticipated to be commercially available. These accelerators may lower the cost of interactive RTDVR and increase performance over previous non-custom solutions. Moreover, they are designed for use in personal computers. Previous solutions for real-time volume rendering used multi-processor, massively parallel computers or texture mapping hardware. These solutions are typically expensive and not widely available due to, for instance, the requirement for parallel computers. Alternatively, these solutions generate lower quality images by using texture-mapping techniques.

Although accelerators have increased the availability and performance of volume rendering, a truly general-purpose RTDVR accelerator has yet to emerge. Current accelerators generally support parallel projections and have little or no support for perspective projections and stereoscopic rendering. These different projections are illustrated in FIG. 2. Stereoscopic rendering is a special case where two images, generally two perspective images, are generated to approximate the view from each eye of an observer. Stereoscopic rendering typically doubles the amount of data to be processed to render a stereoscopic image. Moreover, current accelerators also require high memory bandwidths that can often exceed 1 Gbyte per second for a $256^3$ dataset.

Furthermore, these current accelerators are typically either image-order or object-order architectures. An image-order architecture is characterized by a regular stepping through image space and the object-order architecture is characterized by a regular stepping through object space. Image-order ray casting architectures may support algorithmic speed-ups, such as space leaping and early ray termination, and perspective projections. Object-order architectures tend to provide more hardware acceleration and increased scalability. Object-order architectures, however, have not generally provided algorithmic acceleration. The trade-off between these various limitations are typically either (i) good parallel rendering performance and no support for perspective projections or (ii) good algorithmic acceleration and little hardware acceleration and vice versa.

The voxel-to-pipeline topologies of typical image-order and object-order accelerators are shown schematically in FIGS. 3 and 4, respectively. Image-order architectures must access several voxels from a volume memory per processor. This typically causes a bottleneck in achievable hardware acceleration and thereby limits the number of useful processors. For example, as illustrated in FIG. 3, a typical image-order architecture has an 8-to-1 bottleneck for each image-order pipeline. Although algorithmic acceleration for the reconstruction, classification, shading and the composition of the voxels can often increase performance, such an increase in performance is often outweighed by the voxel bottleneck in the memory system, thereby limiting the overall acceleration.

As depicted in FIG. 4, object-order pipelines generally require only one voxel access per processor thereby providing greater hardware acceleration due to the lack of a voxel or a memory bottleneck. Object-order reconstruction of the dataset, however, makes it difficult, if not impossible, to implement algorithmic acceleration or support perspective projections.

Neither image-order nor object-order architectures are general-purpose techniques because of their limitations. For example, image-order architectures only deliver interactive performance for certain types of datasets by relying heavily on algorithmic acceleration. Performance can be extremely sensitive to viewing parameters (and dataset characteristics) potentially causing large fluctuations in performance. On the other hand, object-order architectures yield more consistent performance but typically do not support perspective projections. As a result, these architectures cannot be used for applications that require stereoscopic rendering, virtual reality, computer graphics, computer games and fly-throughs.

Thus, there is a need for a device capable of general-purpose volume rendering performance that supports interactive rendering for both parallel and perspective projections. Furthermore, there is a need for a general-purpose device that supports interactive rendering for stereoscopic displays.

SUMMARY OF THE INVENTION

The present invention is a general-purpose device that supports interactive rendering for parallel and perspective projections and stereoscopic rendering thereof. The general-purpose device is further characterized as a digital electronic system for real-time volume rendering of a 3D volume dataset. A new hybrid ray casting is used to volume render a real-time image from external memory. Volume rendering includes reconstruction, classification, shading and composition of subvolumes or voxels of a volume dataset representing the 3D image. Early ray termination and space leaping accelerate the processing of the voxels by dynamically reducing the number of voxels necessary to render the image. Furthermore, the underlying hardware of the present invention processes the remaining voxels to in an efficient manner. This allows for real-time volume imaging for stereoscopic displays.

The hardware architecture of the present invention supports projection-guided ray casting, early ray termination and space leaping for improved memory usage. The hardware architecture further accelerates the volume rendering due, in part, to regular and predictable memory accessing, fully pipelined processing and space leaping and buffering of voxels to eliminate voxel-refetch.

The incorporation of the projection guided ray casting, including early ray termination and space leaping, and the hardware architecture permit rendering of the image where the rendering is not the critical time-consuming operation. In other words, the present invention can render many volumes in a faster time period than the entire volumes can be read from external memory.

Another aspect of the present invention includes a method for volume rendering an image where there is no substantial refetching of data from external memory. Perspective projections, under certain circumstances, may require a minimal, but non-limiting, refetching of some data. The method includes early ray termination and space leaping accelerations and the processing of voxels in predictable manner in hardware to volume render an image in real-time.

DETAILED DESCRIPTION OF THE INVENTION

Figure 1:
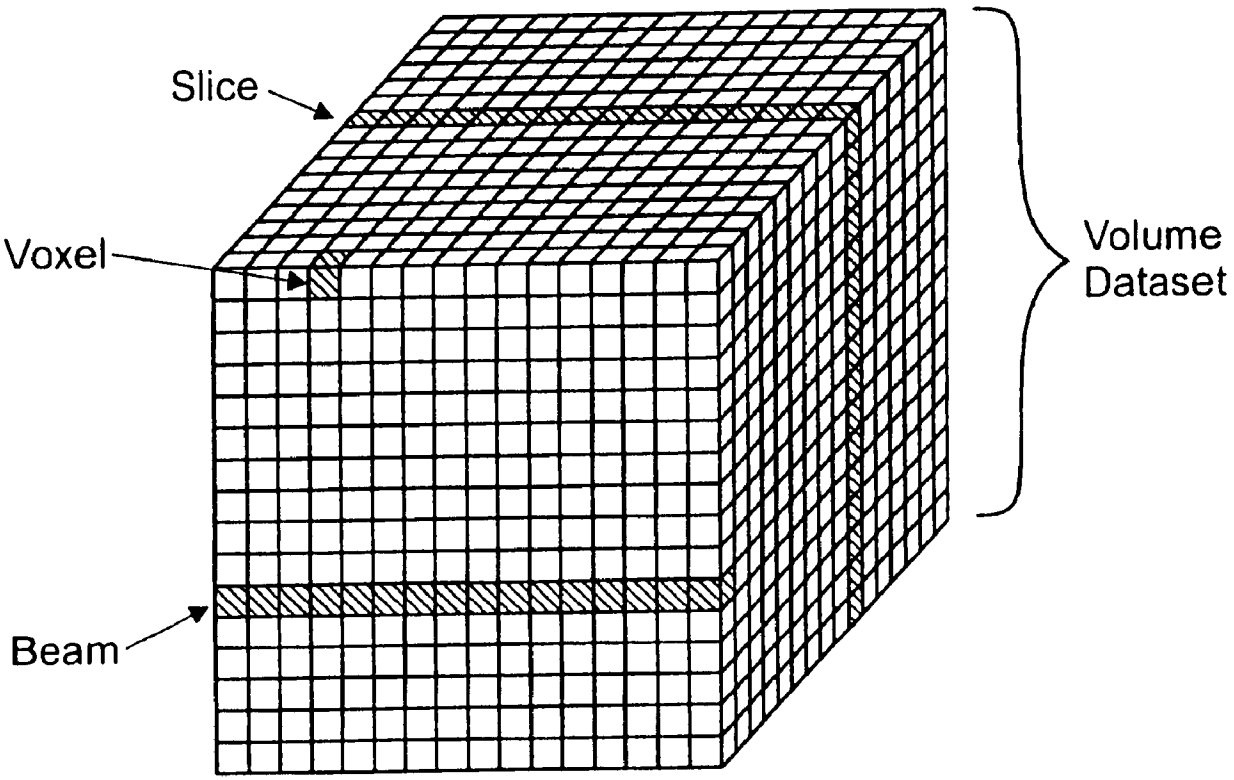
FIG. 1 is a schematic depiction of a volume dataset for rendering an image.
Figure 2:
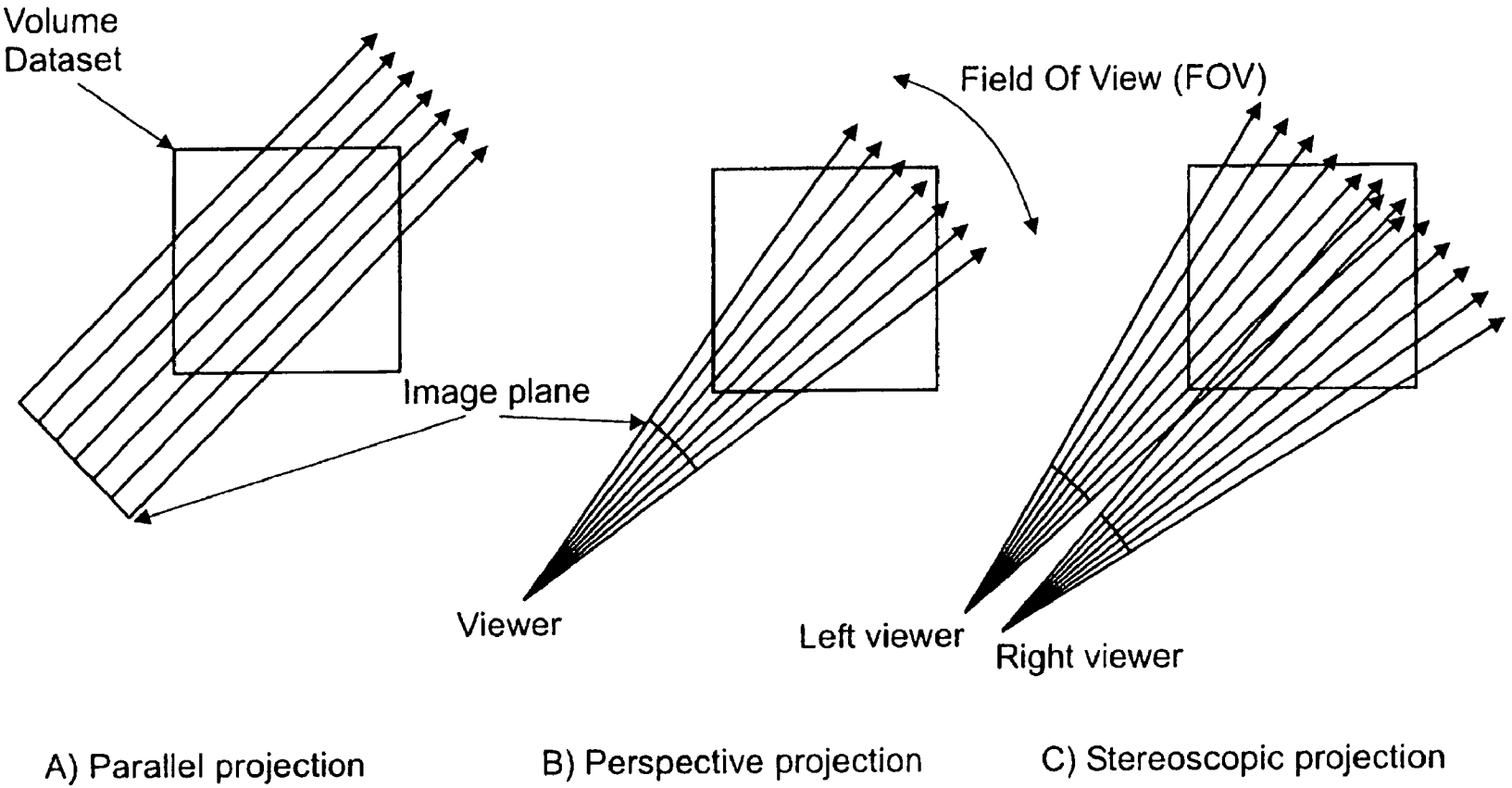
FIG. 2 is an illustration of different projection useful for rendering an image.
Figure 4:
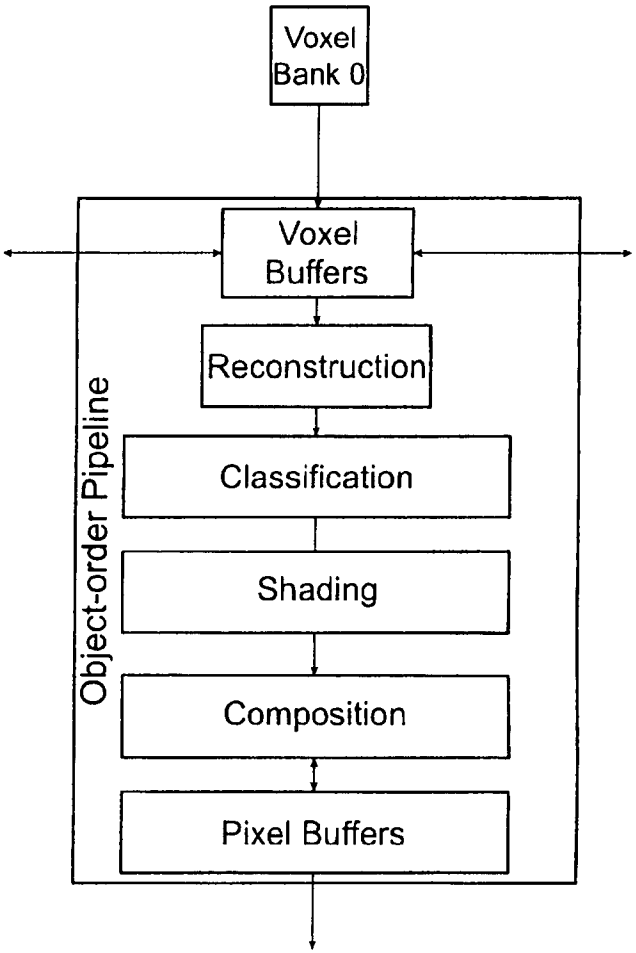
FIG. 4 is a schematic illustration showing voxel-to-pipeline topology or processor of an object-order accelerator.
Figure 3:
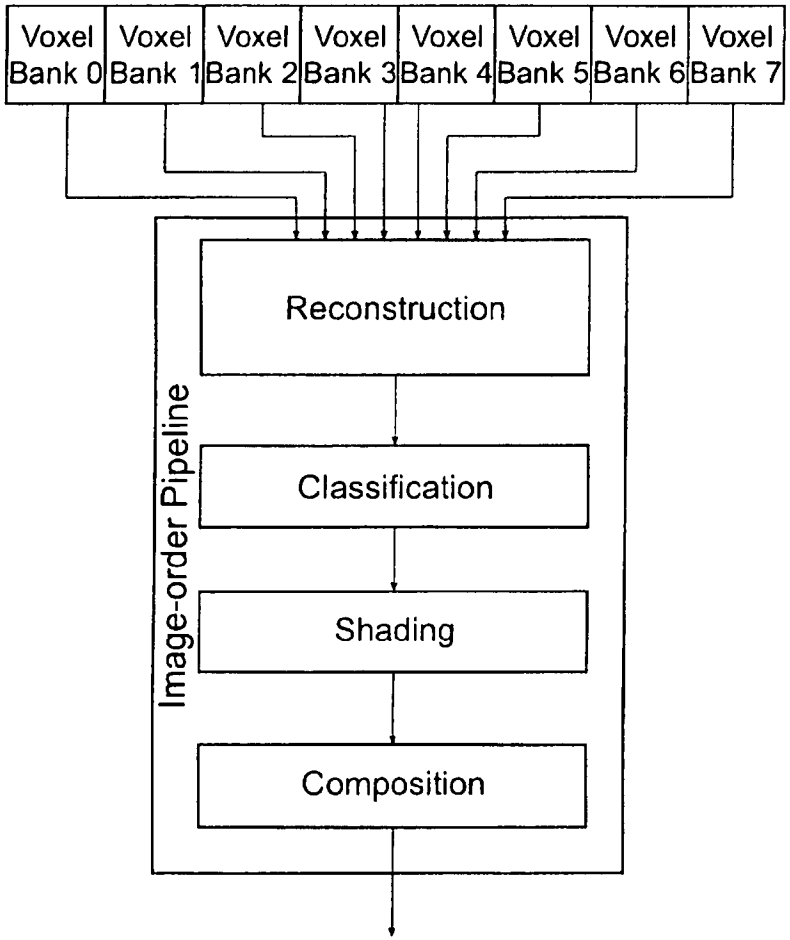
FIG. 3 is a schematic illustration showing voxel-to-pipeline topology or processor of an image-order accelerator.

The system of the present invention is a digital electronic system, including hardware architecture, for real-time volume rendering of a 3D volume dataset. The system of the present invention maximizes processing efficiency while retaining flexibility of ray casting by selecting image-forming voxels, such as non-transparent and non-occluded voxels, for further processing and minimizing the processing requirements or rejecting non-image-forming voxels, such as transparent or occluded voxels.

Desirably, the system of the present invention (1) sustains burst memory accesses to every voxel, (2) constantly accesses voxels from the memory system, (3) does not fetch voxels from the memory system more than once and (4) allows for early-ray termination and space leaping. Sustaining burst memory accesses to every voxel is accomplished, in part, by having each set of voxels being accessed in a regular manner based on the desired virtual viewing position. The number of voxels in the set is dictated by the minimum burst length required to hide the latency of the dynamic random access memory (DRAM) device. The constant access of voxels requires, in part, that the set of voxels be processed in a predictable order so that the correct voxels can be prefetched from memory. This allows fully pipelined rendering and eliminates delays or idle cycles in the hardware architecture. The elimination of refetching is achieved, in part, by having each voxel's contribution to the image-plane being determined when the voxel is accessed, thereby allowing the voxel to be discarded once it is processed. The last condition requires, in part, that rays be launched independently of each other.

The system of the present invention may be included into a personal computer or similar device. Such a device will also typically contain a screen for viewing the rendered graphic image, and typically contains memory.

As described in further detail herein, the present invention includes projection guided ray casting and hardware architecture for rendering real-time images. The projection guided ray casting further includes early ray termination and space leaping, which are discussed below in further detail.

Projection Guided Ray Casting (PGRC)

The hybrid ray casting of the present invention is described as Projection Guided Ray Casting (PGRC) because it successfully merges the benefits of the object- and image-order processing using hardware acceleration and sample processing acceleration. Required memory-bandwidth and computational-throughput for interactive volume rendering is reduced making it possible to render a dataset faster than the entire dataset can be read from memory.

In traditional ray casting, rays are cast through each pixel on the image-plane. Samples inside of the volumetric dataset are reconstructed and rendered at evenly space intervals along each ray. Image-plane traversal is typically scanline-by-scan-line, which gives rise to random memory access of the volume dataset and multiple voxel refetches which typically thrash the volume memory resulting in poor hardware efficiency due to idle memory cycles. Although the overall efficiency of traditional ray casting may possibly be enhanced by algorithmic acceleration, the low hardware acceleration efficiency typically causes the rendering performance to be slower than the reading of the dataset from memory. These aspects of traditional ray casting typically limit its performance.

Figure 5:
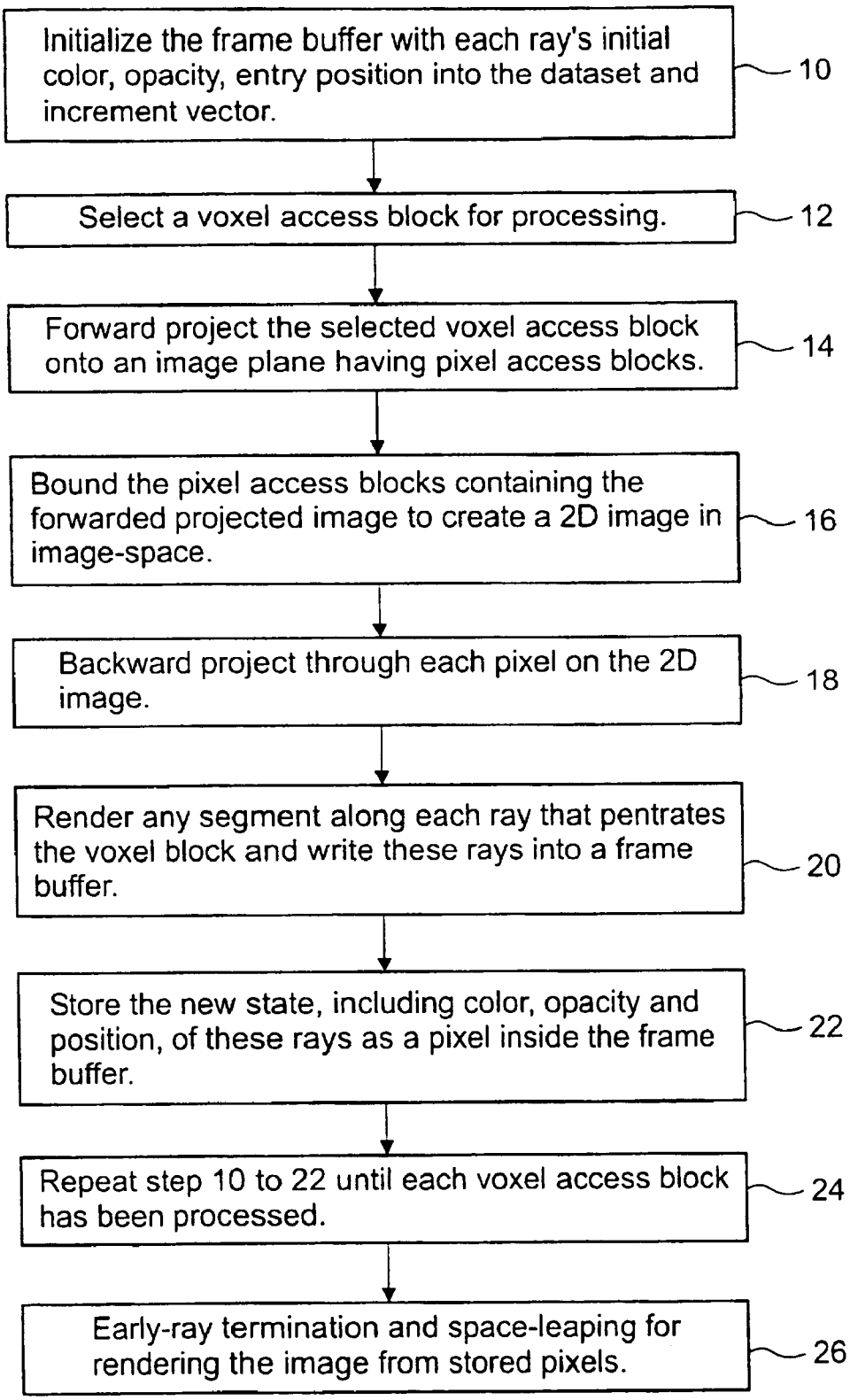
FIG. 5 is a schematic illustration of the projection-guided ray casting of the present invention.
Figure 6:
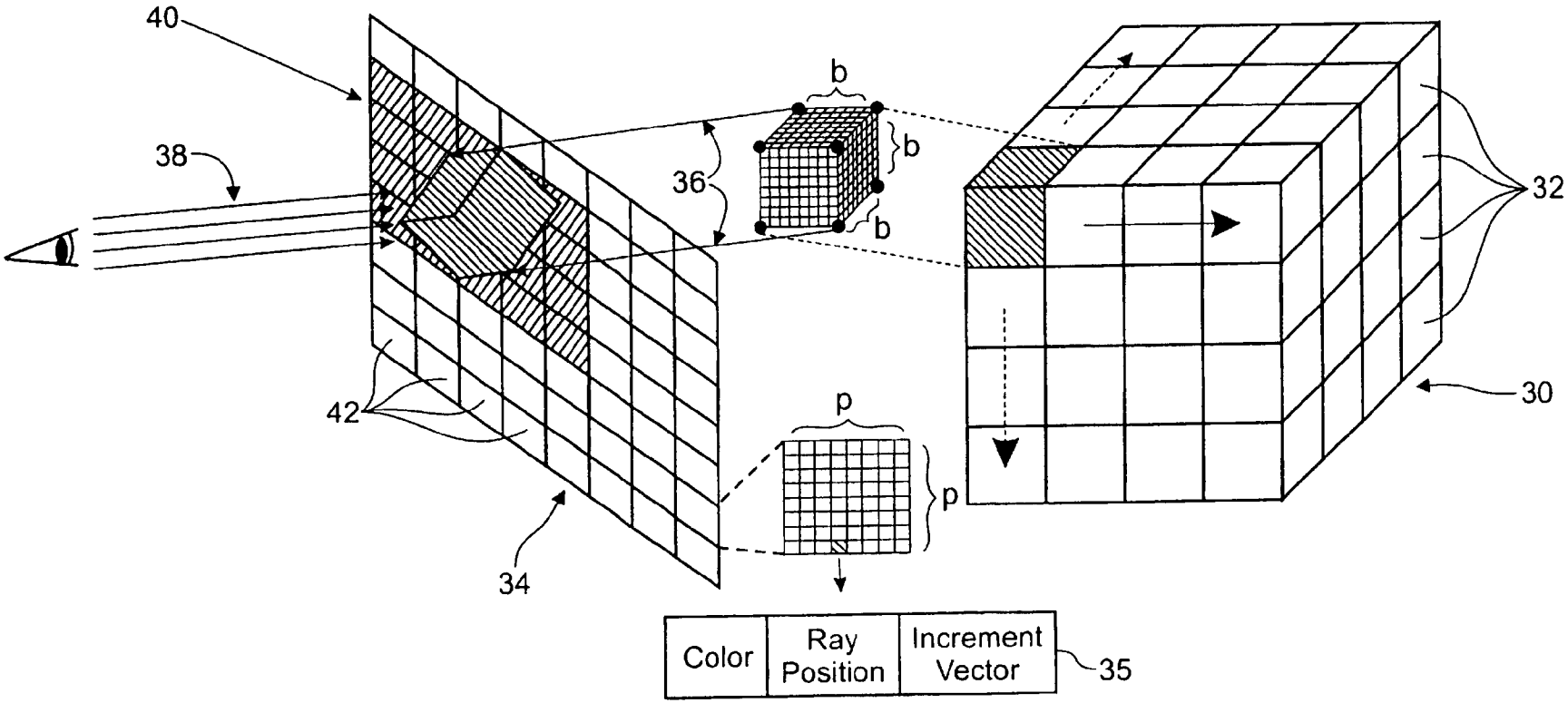
FIG. 6 is a conceptual illustration of the projection-guided ray casting of the present invention.

A schematic and a conceptual illustration of PGRC are shown in FIGS. 5 and 6, respectively. PGRC uses forward projections to enhance the memory performance of the ray casting. The dataset 30 is partitioned into hundreds or thousands of sub-volumes referred to as voxel access blocks 32. Ray casting is applied to rays that penetrate these voxel access blocks 32, when the voxel access-blocks are accessed from memory Since these voxel access blocks 32 are small, they project to a small portion of the image-plane. Only the small groups of rays that penetrate each voxel access block 32 are rendered. The PGRC iterates over each voxel access block 32 with a front-to-back processing thereof until the entire dataset 30 is processed. In PGRC virtually all voxel re-fetch is eliminated.

Forward projections that are used during PGRC may also used during scan-conversion in traditional 3D polygon-based acceleration. Scan-conversion hardware is an integral part of personal computers and workstations. Using a view transformation matrix that maps from object-space to image-space, each vertex can be projected onto the image-plane. The polygon is filled with a color and/or texture (texture-mapping). In PGRC, these conventional scan-conversion computations along with a front-to-back processing of voxel access blocks 32 are used, in part, to eliminate memory thrashing in the ray-casting algorithm.

Referring to FIG. 5, at step 10 a view transformation matrix is computed based on the desired view or perspective. A frame buffer is initialized with the entry-point of each ray into the dataset 30. At step 12, a cubic set of voxels or the voxel access blocks 32 are selected and processed in front-to-back order. Voxel access blocks 32 are a "b×b×b" array of voxels as shown in FIG. 6. At step 14, eight voxels on the corner of a voxel access block 32 are each projected onto the image plane 34 using a view the transformation matrix or forward projectors 36, as depicted in FIG. 6, forming a 2D footprint 40 in image-space. At step 16, the pixel access blocks 42, which contain the forward projected image, is bound to complete the creation of the 2D footprint 40 in image space.

At step 18, rays of backward projectors 38 are then cast through each pixel that lies on or within this 2D footprint 40. At step 20, the segment along each ray that penetrates the voxel access block 32 is computed. Upon exiting the voxel access block 32, the rays are written into a frame buffer 35. The new state (color, opacity, and position) of these rays is stored at step 22 as a pixel inside of the frame buffer 35. The above steps are repeated for each voxel access block 32 in front-to-back order until every voxel access block has been processed.

Figure 7:
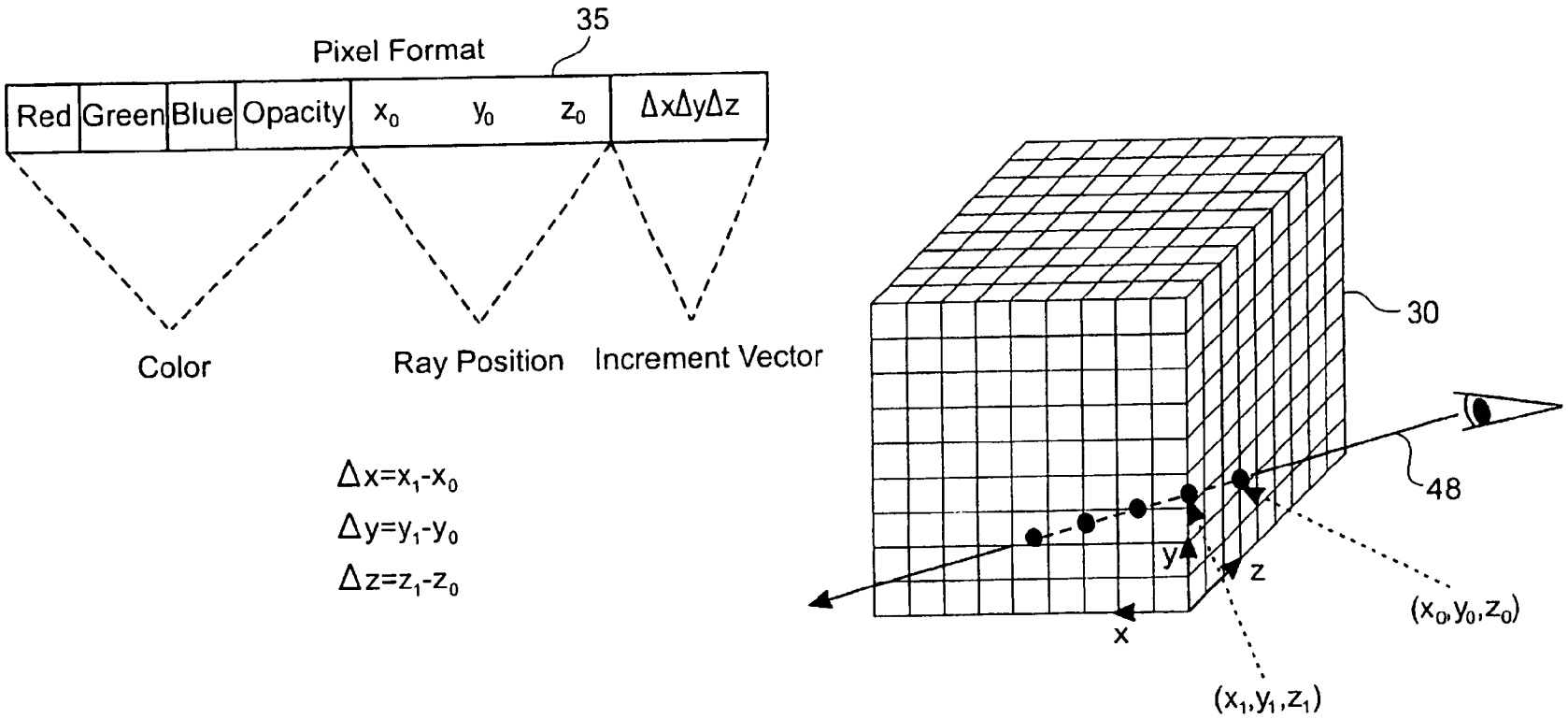
FIG. 7 is a schematic illustration of a frame buffer initialization of the present invention.

As depicted in FIG. 7, the initial intersection of each ray 48 with the dataset 30 is stored into frame buffer 35 along with its X, Y and Z increment vector. The opacity and color values are initialized to zero for the entire frame buffer.

Voxel access blocks are processed from front-to-back order to allow early-ray termination. Since front-to-back ordering depends on a particular view position and view direction, which are known prior to rendering, the next voxel access block is prefetched allowing fully pipelined operation in hardware. The direction of projection can be determined from the viewing parameters. It is a vector pointing from the center of projection towards a viewer. The eight corner voxels of each voxel access block 32 are projected onto the image-plane 34. The resulting vertices are mapped into image-space using a view transformation matrix.

The eight projected vertices form a convex region in image-space are then filled using well-known scan-line algorithms. The filling process determines the pixels (i.e., rays) that lie within the 2D footprint 40 of voxel access block. As a result, only the exact rays that are needed are cast.

As discussed above, ray casting is applied to each ray from the true 2D footprint of the voxel access block. In practice, however, clipping regions are projected onto the image-plane instead of the voxel access block boundaries. Clipping regions are a function of the front-to-back ordering and type of projection. Clipping regions represent portions of a projected voxel access block near a projected ray and these clipping regions are processed for image rendering. Clipping regions are both translated by and enlarged so that the clipping region coincides with data in the internal buffers. The clipping regions are enlarged by one to handle reconstruction computations, such as interpolation and gradient computations, in the proximity of an intra-block space.

Each pixel in the frame-buffer contains the state of the ray that penetrates it. Using an increment vector and the sample location of the ray, a segment of the ray is rendered until it exits the voxel block's clipping region. For perspective projections, the clipping region closest to the viewer is accessed first.

Early Ray Termination and Space Leaping

The PGRC algorithm directly supports early-ray termination and space leaping. Both of these are "algorithmic acceleration" techniques because they reduce the amount of computation for rendering an image. Conceptually, early-ray termination selects non-occluded voxels for further processing and rejects occluded voxels from further processing. The dataset is not tested over all samples the viewing parameter dictates supersample. Because of the fully pipelined design, voxel access block memory accesses are overlapped with the processing of another voxel access block; therefore, there is no performance benefit in completing a voxel-block early unless the voxel-block is supersampled. During supersampling, however, the memory system is delayed for a length of time proportional to the sample-to-voxel ratio. Early-ray termination reduces or eliminates these delays.

Using early-ray termination, every voxel access block inside of the dataset is accessed only once. Therefore, the peak performance is equal to the rate at which the entire dataset can be read from memory. Since one goal of the present invention is to render the dataset faster than it can be read from memory, a more aggressive data processing acceleration technique is used that allows the skipping of the memory access to entire voxel access blocks.

Space leaping can provide substantial acceleration for many datasets especially medical datasets where the regions of interest are typically near the center of the volume and there is a lot of empty space. Space leaping skips, or leaps over, transparent regions and requires either explicit or implicit distance information. The dataset is preprocessed and the distance to the next non-transparent sample along a ray is stored for each voxel inside the dataset. Encoding a distance at each voxel requires added memory and preprocessing overhead. In the present invention the additional memory requirements are minimized or reduced. Distances are encoded for a group of voxels thereby reducing the overall leaping distance which lowers memory requirements while only slightly reducing the acceleration achievable through space leaping.

Using implicit distance information, regions inside of the dataset are flagged transparent or non-transparent. When a ray advances to a transparent region, the ray can be quickly incremented through the region, taking into consideration the orientation and size of the region. This method has advantages over explicitly storing distances. For example, this method uses much less memory, for instance a single bit per region. Moreover, preprocessing involves simply comparing each voxel inside of the region to a user-defined threshold and this can be computed on-the-fly. Desirably, implicit distance information is used to leap over empty regions.

The volume data is first rendered as described above. As the dataset is rendered, each voxel contained a voxel access block is compared against a user-defined transparency threshold. If every voxel is below the threshold, then the voxel access block is flagged empty in a small binary lookup-table. This table is called an empty voxel access block table. After the first image is rendered, the table can be applied to subsequent images until the dataset or user-defined transparency threshold is altered. Desirably, the empty voxel access block table is checked before accessing a voxel-block from the volume memory. In order for a voxel access block to be skipped, the voxel access block and its 26 neighbors must be transparent. The 26 neighbors are required to be transparent because of the way voxels are buffered and the clipping regions are translated. If the entire neighborhood of voxels is empty, any ray in the clipping region can be incremented by a dimension, b, of the voxel access block, regardless of the direction of the increment vector. Thus, perspective projections are supported by the present invention. Furthermore, the time to process a voxel access block is reduced. One benefit of this acceleration is that the overhead of computing the empty voxel access block table is completely hidden by useful work.

Hardware Architecture

The hardware architecture of the present invention is called Resample and Composite Engine (RACE) and is a hardware engine for, among other things, accelerating real-time volume rendering of a graphic image by having image-forming voxels available for processing without having to refetch a substantial number of voxels from external memory, such as the memory contained within a personal computer. An overview of the hardware architecture is described below, followed by a description of the data flow for the processors and the controllers of the present invention.

Figure 8:
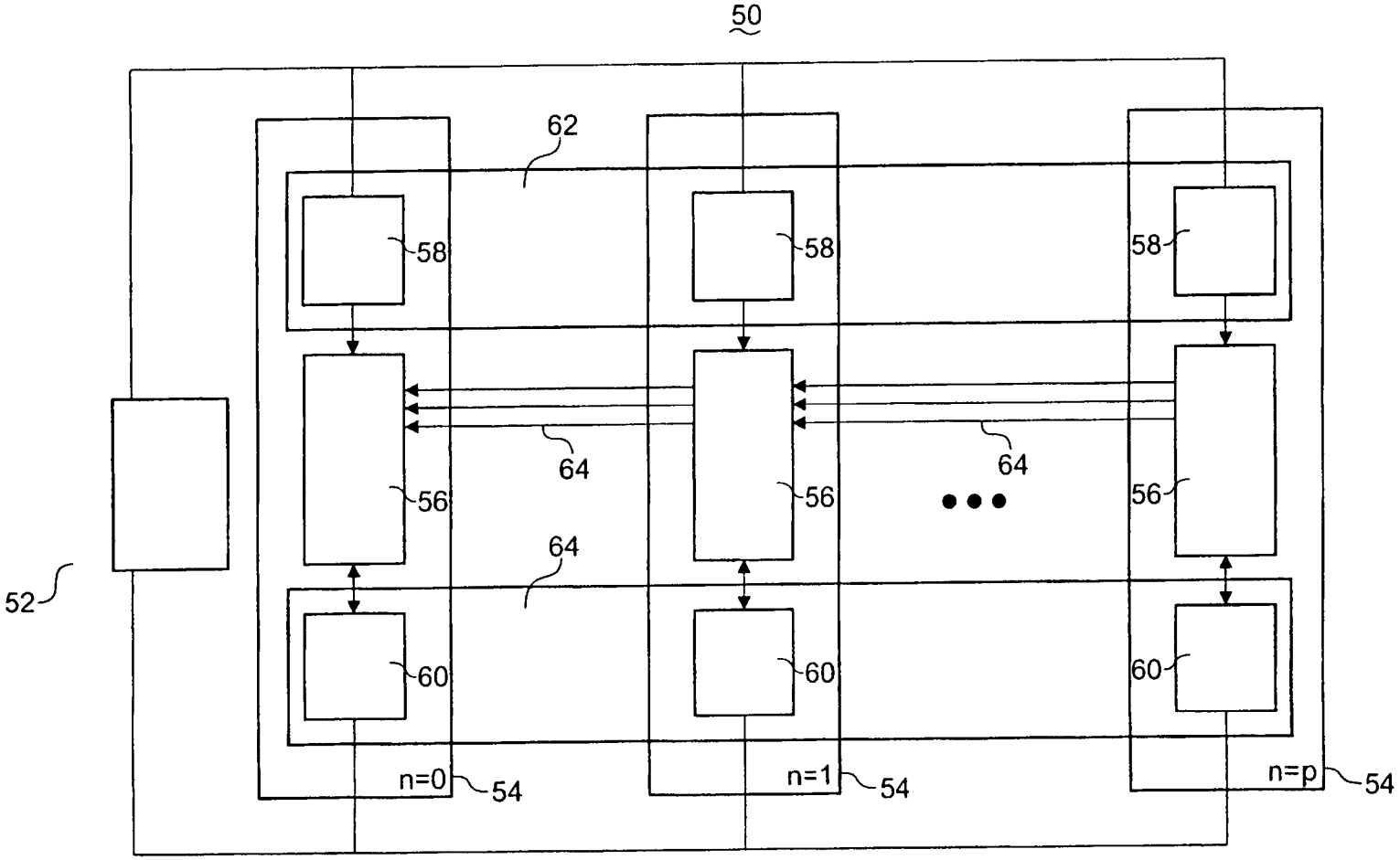
FIG. 8 is a schematic overview of the hardware architecture the present invention.

An overview of this hardware architecture is shown schematically in FIG. 8. The hardware architecture 50 contains a control unit 52 and a plurality (p+1) processors 54. Each processor 54 contains a rendering unit 56, a volume memory 58 and a pixel memory 60.

The control unit 52 implements, among other things, object-order projection to control memory accesses to the voxel and pixel memories. The rendering units 56 implement the image-order ray casting, voxel-buffering and clipping. The control unit 52 provides synchronization for each processor 54 and generates memory addresses for all transactions on both the voxel memory bus 62 and the pixel memory bus 64. The volume memory 58 stores the data volume. The pixel memory 60 stores the color and the current state of each ray during the ray casting process.

The RACE architecture partitions the dataset into thousands of subvolumes or voxel blocks. In multiprocessor RACE configurations, each subvolume is equally divided among each processor 54. As the voxels are streamed into the processors 54 from the volume memory 58, they are quickly distributed among processors using local communication. Each processor 54 has a dedicated connection to the volume memory 58. Voxels from other processors are distributed using local neighbor-to-neighbor communication in a circular faction.

With a "p+1" number of processors 54 in the system, after p+1 clock cycles, each processor 54 contains a local copy of the voxel-block. This allows fast random interpolation from high-speed internal SRAM memories. This is important for supersampling and for discrete ray-tracing architectures. Central differences at grid-points are computed on this fixed stream of voxels and stored into a gradient buffer. Alternately, voxels can be stored in a quad-ported SRAM allowing gradients to be computed directly from adjacent samples. This alternate method, however, requires more memory addresses to be generated. The size of the buffer-memory is proportional to the resolution of the voxel-block. Because each voxel gets forwarded to other processors, memory partitioning is not critical and low-order interleaving to distribute the volume may be used. Interleaving allows accesses for each memory module to share a single memory address. Voxel-blocks that have at least 8(p+1) voxels can be stored in contiguous memory locations or interleaved groups of eight voxels between internal memory banks to guarantee peak DRAM memory performance.

The rendered image is written into the pixel-memory 60. Each pixel stores the color, opacity, position and increment vector for a ray that penetrates it. The depth of each pixel in the frame-buffer is approximately twice the depth of pixels used in modern polygon-based accelerators. Modern 3D polygon-based accelerators store color, alpha, z-buffer, and stencil information per pixel using anywhere from 6-8 bytes of data. In the context of volume rendering, doubling the depth of the frame-buffer is reasonable because memory capacity is dominated by the volume buffer. As an example, frame-buffer capacity is typically 4 MB to 16 MB whereas 3D datasets often require 32 MB to1 GB of storage capacity. The current trend in medical and scientific visualization is higher resolution datasets that consistently require over 128 Mbytes of memory storage. In the present invention each pixel memory also responds to a single memory address using low-order image interleaving. The frame buffer is partitioned equally among processors. The least significant bits of the pixel position dictates which processor owns the pixel. Low-order interleaving enhances load balancing between processors because of spatial coherence.

Before rendering starts, the RACE frame buffer is initialized with a color, opacity and the ray's entry position into the volume dataset or at the front-clipping plane. For perspective projections, the increment vector per ray is stored into the frame buffer. A slope-per-ray is only stored for perspective projections. For parallel projections, a register inside of the processor stores the increment vector and is updated once per projection. During shading, 3D accelerators interpolate values across the face of polygons. Typically, a color intensity (Gouraud shading) or a normal (Phong shading) is interpolated. To initialize the frame buffer, the color components of a voxel are assigned to be the actual position of the voxel for use in the Gouraud shading model. For parallel projections, the three visible faces can be then rendered as polygons to initialize the frame-buffer. For perspective projections, the view position is subtracted from each position and normalized to determine the increment vector. Since these calculations are 2D and performed once per projection, they will not cause a bottleneck in the 3D volume rendering performance.

The controller 52 generates addresses for the volume memory 58 and pixel-memory 60. Addresses for the volume memory are determined by the front-to-back ordering of the voxel access blocks and this ordering is based on user-defined viewing parameters. The controller 52 stores the empty voxel access block table that allows skipping of transparent or undesired subvolumes. Before issuing a memory access for a voxel access block, the controller 52 first checks the empty voxel access block table to determine if the block and its 26 neighboring voxel access blocks are transparent. If so, the controller 52 advances to the next voxel access block in front-to-back order and repeats. If the voxel access block or any of its 26 neighbors are not empty, the controller 52 generates the appropriate memory addresses for the DRAM memory.

For each voxel access block, the controller 52 computes a corresponding clipping region based on the front-to-back ordering. The 2D footprint of each clipping-region is determined using the view transformation matrix. The view transformation matrix is applied to each corner of the clipping-region. A bounding box in image-space is computed based on minimum or maximum coordinates thereof or, alternatively, scanconversion can be used to compute a footprint. The footprint is rounded to pixel-block boundaries. The controller 52 issues a memory address for each pixel-block inside of the footprint. The frame buffer responds by delivering an array of pixels. These pixel-tiles can be stored in contiguous memory locations on a DRAM page or interleaved between memory banks such that they can be accessed at the peak speed of the memory system.

The processors 54 perform the image-order ray-casting algorithm, voxel-buffering, and clipping to the local clipping region and global view-frustum. Each voxel from the processor's dedicated pixel memory 60 is streamed into internal buffers. Voxels 64 from other volume memory modules are streamed in from the right neighbor. The processor 54 also forwards voxels 64 to its left neighbor. The entire sub-volume is distributed to each processor 54 in a circular fashion using neighbor-to-neighbor communication. Therefore, each processor 54 receives "p" voxels per clock-cycle, i.e., one from its dedicated memory system and "p−1" from its right-neighbors. Conceptually, this is the same as connecting all memory modules to every processor, however, to limit the fan-out on the memory bus, voxels are forwarded to neighboring processors. This increases the pin-out of the application-specific integrated circuit (ASIC).

Each of the "p" voxels is written to appropriate internal slice or voxel block buffers inside the rendering unit. Voxels are buffered to eliminate duplicate accesses to the volume memory, and this allows for reconstruction near the gaps between voxel blocks. Two slices of voxels are buffered for interpolation and gradient computation in each of the advancing directions. The first slice is necessary to interpolate samples that lie in between adjacent subvolumes. The second slice is needed to interpolate samples on the advancing faces of the previous block. Also, a slice of central difference gradients are buffered. The volume-slice buffers will dominate on-chip storage.

Processor Data Flow

Figure 9:
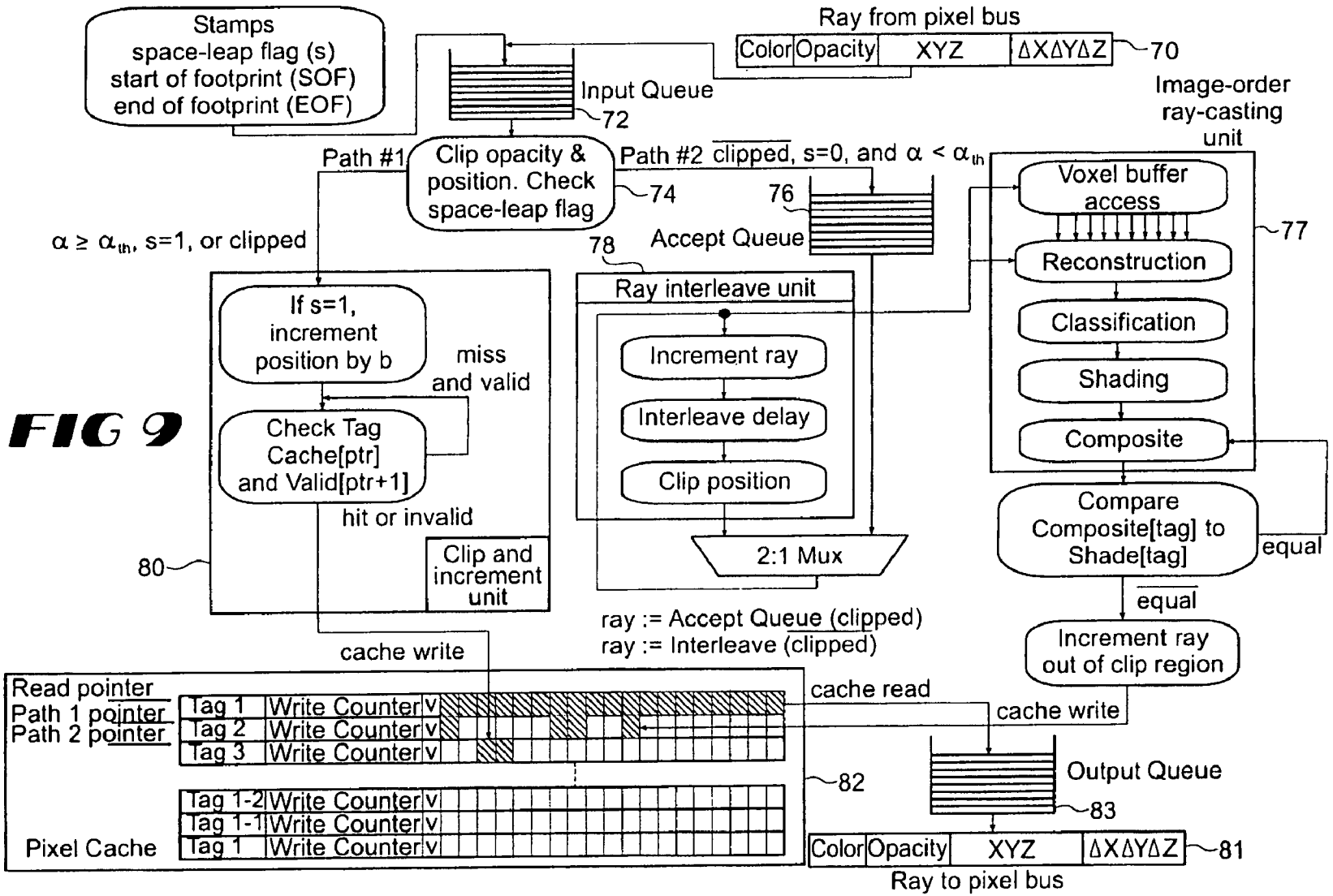
FIG. 9 is a schematic depiction of data flow for processors of the hardware architecture of FIG. 8.

FIG. 9 is a schematic illustration of the data flow for the processors 54. Each processor 54 receives a stream of pixels (rays) 70 from the frame-buffer and queues them in an input queue 72. Each ray 70 entering the input queue 72 is stamped with a tag (pixel-block address) and offset (relative position inside of the pixel-block). Each 2D footprint is delimited by a start-of-footprint (SOF) and end-of-footprint (EOF) flag so that the processor 54 can match clipping-regions to rays (pixels). In addition, a space-leap (SL) flag is used to determine if the ray can skip over the clipping region without rendering. These stamps originate from the controller 52.

Rays read from the input queue 72 are loaded into a new ray register 74. The following fields in the ray register 74 are checked: EOF/SOF flags, opacity threshold, SL flag, and position. EOF/SOF flags are used to synchronize (or switch) clip-regions. The opacity threshold is used to prevent the rendering of occluded samples, i.e., early ray termination. Conversely, the SL flags prevent the rendering of transparent samples. The ray's position is examined to see if it lies within the active clip-region.

Ray's that are not opaque, clipped, or skipped are sent to the accept queue 76 to be rendered all other rays take a second path (or clip path). Along the clip-path, if SL flag is set and the ray-position was not clipped, then the position is incremented (space-leaped) through the clip region. Then, these rays are written to the appropriate line inside of the pixel-cache.

After exiting the accept queue 76, least significant bits from the x-, y-, and z-ray positions are used to address the voxel and gradient buffers. The fractional components are used as weights for the trilinear interpolations. The color, opacity, position and increment vector proceeds through the ray-casting pipeline. A ray interleaving unit 78 interleaves rays from the accept queue 76 onto the inputs of image-order ray caster 77. Ray interleaving is used to eliminate data hazard due to possible feedback in the composition calculation. The ray interleave unit 78 coordinates that two consecutive (or adjacent) samples along the same ray are at the output of the shader stage and the output of the composition stage. This guarantees that two samples along the same ray are blended together The rendered ray is added into the pixel-cache 82. No cache misses are possible on this path because each ray that is added to the accept queue 76 gets a reserved cache-line. Otherwise, it is not loaded into the accept queue 76 until a cache-line becomes available. Each write-access to a cache-line increments a counter for the corresponding cache-line; it can be determined when the cache-line (i.e., pixel-tile) is complete and ready to be written to the frame-buffer.

Once complete, the entire cache line is serially added to an output queue 83. Then, the valid bit and write counter for the cache-line is cleared. Whenever the output queue 83 is not empty, the processor 52 sends a write-pending flag to the controller. When the pixel-bus becomes inactive, the controller issues a write acknowledge causing the pixel-block to be streamed from the output queue 83 onto the pixel-bus. In a multiple processor configuration, the controller must receive a pending flag from each processor before releasing the pixel-bus. For most of this analysis, the terms pixel and ray are completely interchangeable since only one ray penetrates a given pixel.

The voxel buffer logic is responsible for generating central difference gradients and storing voxels at the correct locations in the internal static-RAMs (SRAM). There are four types of buffer memories: voxel-block, block-slice, beam-slice and volume-slice. One set of buffers store voxels and another set stores central differences at on-grid positions. Central differences are computed as the voxel-block is streamed into the processor. When accessing the buffers for interpolation, gradient buffers and voxel-block buffers respond to a single memory address. Each buffer is an eight-way interleaved SRAM to provide the necessary voxel values to reconstruct the sample value and each component of the gradient in parallel.

Two voxel slices and one gradient slice are buffered in each advancing x, y, and z direction. These buffers are double-buffered to allow access to a previous slice and to update the next slice for subsequent voxel-blocks. Front-to-back ordering proceeds beam-by-beam then slice-by-slice. As a result, these slices will dominate on-chip storage requirements. In general, architectures that seek to eliminate voxel-refetch must buffer slices unless smaller reconstruction kernels are used for samples near a slice boundary.

To reduce memory, the slice of gradients can be eliminated by buffering a third slice of voxels and re-computing central differences for this particular slice. Desirably, the slice of gradients is buffered to simplify computation.

Various methods can be used to remove or reduce the size of the volume-slice buffer, including, but not limited to, storing the volume-slice memory in off-chip memory or pixel memory, rendering the dataset in sections and prebuffering. When the volume-slice memory is stored in the frame-buffer having a wide connection, the volume-slice buffer could be completely eliminated. In the RACE architecture, the pixel interface is wider than the voxel interface (e.g., 16 bytes). Therefore, these slices can be quickly loaded from the pixel memory. Each processor accesses the volume-slice from their dedicated pixel-memory.

To reduce the size of the volume-slice buffers, the dataset can be rendered in sections. The volume-slice buffers are inversely proportional to the number of sections used. Voxels residing on/near a boundary of a section are re-fetched from the volume memory slightly lowering performance. Any face of a voxel-block can potentially lie on the boundary of a section. As a result, the memory accesses to any of the six faces may cross DRAM-page boundaries due to our low-order interleaving scheme. Alternately, the voxel-block can be organized such that boundary block-slices can be retrieved conflict-free from any direction using a skewed memory organization.

Auxiliary voxel-buffers (beam-, block- and volume-slice) may be eliminated by accessing a voxel-block and boundary voxels from neighboring voxel-blocks each time the block is accessed. This method is a prebuffering method because the dataset can be reorganized during a quick preprocessing stage which combines each voxel-block with a surrounding shell of voxels inside of the memory (increasing memory capacity). This creates self-contained blocks that have all of the necessary information to reconstruct samples that lie in a $(b+1)\times(b+1)\times(b+1)$ subvolume; however, the buffers must be $(b+3)\times(b+3)\times(b+3)$ in size. Therefore, this method will lower performance by introducing some duplicate memory access to the volume memory, especially for small-blocks. It has the advantage of simplifying internal buffering logic and reducing the number of separately addressable buffers from four to one for the interpolation and gradient memories. These buffers are internally eight-way interleaved.

Moreover, because of the block processing utilized by the RACE architecture, higher-order gradient filters can be used without incurring a performance penalty. Gradient encoding or lookup-table based gradients can also be incorporated into the architecture. The logic that converts the stream of voxels into central differences at on-grid locations can be and replaced by lookup-tables containing gradient components.

After the gradient and interpolation computations, the interpolation value is used to index the classification tables for the red, green, blue and opacity transfer functions. Optionally, the gradient magnitude may be used to modulate the opacity function. This highlights surface boundaries and increases the transparency in homogeneous regions of the dataset. The gradient magnitude computation requires a computationally expensive square root operator. It can be approximated using the norm of the gradient vector or using iterative numerical methods.

The pixel cache serves several purposes, including retiring two rays every clock cycle, i.e., one skipped (or clipped) and one rendered, synchronizing the pixel-blocks with the controller and completing out-of-order pixel-block.

Each ray entering into the RACE pipeline takes one of two paths: accept path (path #1, for rendering) or the algorithmically skipped/clipped path (path #2, little/no processing). Path #1 processes ray segments that are not algorithmically eliminated and lie inside of the clipping-region; therefore, they must be rendered. Each of these rays are loaded into the accept queue 76.

Along the first path, all rays are rendering using the conventional ray-casting algorithm until they exit the clipping-region. Once they exit, rays are written to the current cache-line or the next sequential cache-line, i.e., pixel cache. No cache misses occur along this path; because, a cache-line is reserved before the ray enters path #1 and the cache-line is not discarded until the all rays from the cache-line has been processed.

Path #2 handles two cases: the segment of the ray is algorithmically eliminated (skipped/occluded) or the ray's current xyz position is outside of the voxel-blocks clipping region. Along Path #2, the Clip-and-Add Unit 80 increments the ray's position if the SL flag is set and the ray is inside of the current (space-leapable) clip-region. This adder increments the ray position by a distance of b in the ray's primary direction. This quickly advances the ray through an empty voxel-block. This allows the ray-position to be incremented by another ray-position that is exactly one voxel-block in the major viewing direction along the ray with a single increment. Also, by limiting the norm to be a power of two, each component of the increment vector is scaled using a shift-register.

After exiting the clip-and-add circuitry 80, rays are written to the pixel cache 82. If a cache-hit occurs on the current cache-line, the ray is written at the appropriate address in the cache line. The current cache-line is indicated by a pointer to the cache. This cache utilizes three pointers: two write pointers for the Path #1 (render) and Path #2 (skip/clip). Data is read from the cache from a single read pointer and loaded into the output queue 83. Each pointer increments sequentially through the cache.

The pixel cache 82 is direct mapped to a pointer that indexes the cache and not the pixel address. As a result, only one tag compare is necessary regardless of the size of the cache. No tag comparison is necessary for the read-port of the cache. The read ports cycles through each cache-line waiting the write counter to expire before advancing.

If a cache-miss occurs on the path #2, the clip pointer is incremented by one to the next cache-line. Cache misses can only occur for the first pixel inside of a pixel-block. If next cache-line is marked valid, then the clip logic halts all registers between the Input Queue along the clip-path until the line becomes invalid. Once the line becomes available, the line is marked valid and the ray's tag is stored on the cache-line. Then, the ray's color, position and increment vector are written into the cache. Cache-lines are marked invalid after the full number of write operations have occurred to a single cache-line and the entire cache line has been transferred into the output queue 83. The pixel-block is not retired until the cache-line is indexed by the read pointer. Each ray on the cache-line is then transferred into the output queue 83.

In multiprocessor implementations, the pixel-blocks are evenly partitioned among each processor. The size of the cache-line and the termination write-count are inversely proportional to the number of RACE processors. A benefit of this dual-path approach is that two rays can complete on single clock cycle. Furthermore, it allows the majority of the pixels that lie outside of the true-footprint but within the bounding-box to be clipped without causing additional stalls in the image-order ray casting pipeline.

Because sequential pointers index the cache, pixels from the same pixel-block but residing in different processors are written to the same relative cache-line in the corresponding processor. The sequential read pointer guarantees that pixel-blocks are retired in the same order that they are reserved. This provides synchronization with the controller. As a result, the controller can resynchronize the pixel-blocks among multiple processors before they are written over the pixel-bus. The controller simply waits for each processor to generate a write pending signal. After a cache-line is transferred to the output queue 83, the read pointer is incremented to the next cache-line in a circular fashion.

If the output queue 83 is not empty, a flag is sent to the controller to indicate a write pending status. If the queue is full, a critical write-pending status flag is sent to the controller. Once the controller receives at least a write pending status from each processor and the pixel-bus is inactive, it sends a write acknowledge signal to each processor. In turn, the output queue 83 responds by placing pixels serially onto the pixel-bus in a first-in-first-out (FIFO) sequence.

Controller Data Flow

Figure 10:
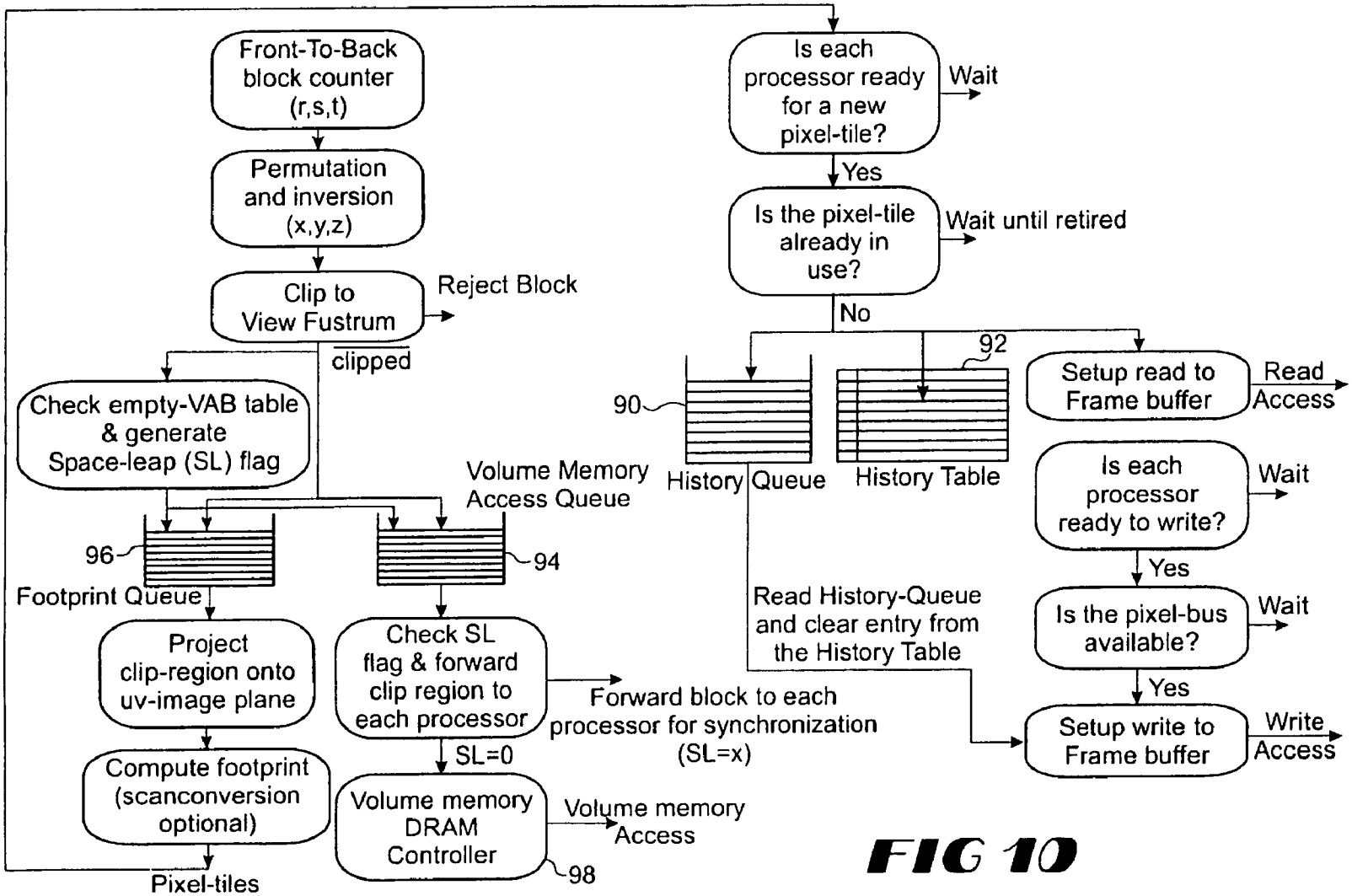
FIG. 10 is a schematic depiction of data flow for controller of the hardware architecture of FIG. 8.

A dataflow for the RACE controller 52 is illustrated in FIG. 10. Front-to-back ordering generates a sequence of voxel-blocks to be accessed from the DRAM memory. These voxel-blocks can be accessed from memory using one or more volume memory addresses based on the size of the voxel-block, b, the DRAM page-size, and DRAM burst size needed to hide latency. The controller 52 is responsible for setting up both read and write memory transfers to the pixel-memory. As the controller issues memory addresses to the frame-buffer, it records the history of the previous, h, memory addresses in a queue called the history queue 90. The maximum number of pixel-blocks that can be processed (or issued) at a given time limited by either the minimum of the history queue size or the number of pixel-blocks that can be stored in the internal buffers (queues and caches) inside of the RACE processor.

When the history table 92 becomes full, the controller 52 stops processing the footprint until a pixel-block is retired. The history queue 90 generates the correct write address when it is time to retire a pixel-block. The history table 92 prevents the accessing of pixels that are already rendered and is a random access copy of the pixel-block address. Each pixel-block entry in the table has a valid/invalid flag. Before any pixel-block is issued to the pixel-memory controller, the pixel-block address is checked to see if it is already being processed. If so, the RACE controller halts the pixel-block access until a pixel-block is retired. Note that this mechanism can potentially be used to re-issue the pixel-block internally inside of the RACE processor enhancing performance. When the controller acknowledges a write request, one pixel-block entry is simultaneously retired from the history queue 90 and history table 92.

The front-to-back generator is a simple three-digit counter that counts voxel-blocks. Voxel blocks are counted beam-by-beam then slice-by-slice until each block in the data volume has been visited.

If a block is clipped, the block is discarded. As a result, the block does not consume any throughput on the voxel-bus or pixel-bus. If the block is not clipped, the 3D empty block table is checked to determine whether or not the current voxel-block and its 26 neighbors are transparent. If so, the block is flagged as empty. For synchronization purposes, the block is loaded in the volume memory access queue 94 and a DRAM memory access is not generated. Instead, the block's clipping region is forwarded to each processor and it is used to clip space-leaped rays. The empty block is also loaded into the footprint queue 96. Once the block reaches the head of the footprint queue 96, its clipping region is projected onto the image plane.

If the voxel-block is not tagged empty, it is issued to the volume memory controller 98 once it leaves the volume memory access queue 96. The controller waits until previous voxel-block access is complete before issuing the next voxel-block.

As blocks exit the footprint queue 96, they are mapped from object-space (xyz) to image-space (uv) using the view transformation matrix. Once the u and v coordinates are computed for each corner of the voxel-block, the footprint of the voxel-block is computed in image-space. In conventional graphics accelerators, a precise scanline algorithm is used to compute the footprint (i.e., projected area) of primitives in image-space. Alternately, the RACE controller using a simple bounding box approximation of the 2D footprint thereby eliminating the need for scan-conversion hardware. Since each ray must be clipped against the current 3D voxel-block, the true 2D footprint is determined inside the processor. By proceeding center outwards, the controller quickly generates a workload for the RACE rendering pipelines by placing rays with longer paths into the queue first. This leads to less sensitivity to fluctuations on the pixel-bus and fewer wasted clock cycles in the pipeline.

The controller checks handshaking signals from the processor to determine whether or not each processor is ready to receive a pixel-block. This signal indicates the near-full state of the input queue 72. If each processor is not ready, the controller halts the projection unit until each processor is ready. In addition, the history table 92 is checked to determine if the pixel-block is currently in-use by the RACE processors. The history table 92 records all of the pixel-blocks inside of the history queue 90. The history queue 90 keeps the correct ordering of pixel-blocks that are being rendered and provides necessary synchronization for write operations on the pixel-bus. Once each processor indicates a write-pending status, the controller issues a write acknowledge signal when the pixel-bus becomes available. The write request signal indicates that data resides in a processor's output queue 83. Each processor responds by placing pixels onto the pixel-bus. The combination of the history queue 90 and pixel cache 82 provide synchronization for write operations. The sequential read pointer that is used to index the pixel cache 82 guarantees that the pixel-blocks are retired in the same order they are read. Memory addresses from the history queue 90 are used to generate the write address for each pixel write operations. When an address is removed from the history queue 90,the entry is also cleared inside of the history table 92.

The controller 52 is also responsible for generating memory addresses for the frame buffer and the volume memory. Furthermore, the controller 52 keeps each engine operating in a fully pipelined manner.

The following example is provided to further illustrate the architectures and methods of the present invention for real-time volume rendering of images. The example is illustrative only and is not intended to limit the scope of the invention in any way.

EXAMPLES

Example 1

The resample and composite engine architecture was simulated in software using a C++ clock cycle simulator. The simulator conservatively assumed that the pixel memory bus operated at the same rate as the voxel memory bus and that the entire dataset lies within the view volume. In practice, embedded DRAM technology can be used for the relatively small pixel memory to enhance performance. Voxel-blocks sizes were varied between $64(4^3)$–$32768(32^3)$ voxels. Pixel-tiles were sized to accommodate 16 pixels per processor. For example, if 4 processors are simulated a pixel-tile containing 64 pixels are used. This allowed the Resample And Composite Engine to hide the memory latency when accessing the pixel-memory.

Each processor was configured as follows: the Input Queue could store up to 128 rays, the Accept Queue could store up to 16 rays, the Pixel Cache could store 128 rays, and the Output Queue could store up to 128 rays. The auxiliary on-chip storage required less than 10K Byte of memory. Voxel buffers were doubled buffered and required either 256, 2K, 16K or 64K bytes of memory based on the block resolution, b. The internal slice-buffers dominated the on-chip storage and required 448K Bytes for a $256^3$ dataset.

The Resample And Composite Engine controller required less than 16 K Byte of on-chip storage for the Opaque Voxel Block (OVB) table, Transparent Voxel Block (TVB) table and internal buffers. An 8-entry pixel-address buffer was used to record the pixel-tiles that were being rendered by the resample and composite engine processors. This prevented the reading of stale data from the frame-buffer. The performance of the resample and composite engine architecture was simulated for six different datasets. The datasets were rendered using a plausible classification mapping. For example, CT datasets were rendered with a mapping of soft tissue to a semi-transparent value and bone to an opaque value. For each dataset, 26 (orthogonal, side and diagonal) view positions were used to estimate average rendering performance. The performance was then compared with the Data Access Rate (DAR), which is the peak rate at which the entire dataset can be read from the memory system. These results are presented in the Table 1 below for a single resample and composite engine processor operating at 100 MHz. In this configuration, the resample and composite engine architecture used only $$200\ \frac{\text{MByte}}{\text{second}}$$

of volume memory throughput.

From this table, the performance of the resample and composite engine architecture consistently outperformed the DAR rate for $8^3$–$32^3$ voxel-blocks when the dataset was larger than $128^3$. In particular, $8^3$–$16^3$ voxel-blocks delivered nearly a 75% increase in performance over the DAR rate with peak performance exceeding 200% (i.e., 3.0 memory efficiency). For small voxel-blocks, the number of pixels per footprint can be greater than the number of voxels inside the voxel-block, therefore, the pixel bus can cause a bottleneck in performance.

A faster pixel interface allowed substantial gains in performance for small voxel-blocks ($4^3$–$8^3$) whose performance was limited by the pixel throughput. Because embedded DRAM's enable increased pixel memory throughput by a factor of 4 or more, this is a promising result. Each ray (or pixel) read from the frame buffer was also written, therefore, the read and write throughputs were identical. Small voxel-blocks consumed less than the full bandwidth of the volume memory bus because of algorithmically skipped blocks. This feature is exploited in shared memory accelerators, such as accelerated graphics port (AGP), when the dataset is rendered directly from main memory.

The pixel-bus was not limiting performance for larger voxel blocks. Furthermore, the sharing of pixel interfaces between two or more resample and composite engines can be potentially realized with only a small penalty in performance.

The memory efficiency of the resample and composite engine architecture generally increased with an increase in dataset resolution. Comparing the relative memory efficiency of a low resolution $64^3$ dataset and a higher resolution $256^3$ dataset revealed more than a 100% increase for $8^3$ voxel-blocks, as described in Table 1. This is because large datasets tended to have corresponding larger regions of non-image forming voxels. As a result, expected average performance for a resample and composite engine architecture configured with $8^3$–$16^3$ size voxel-blocks to exceed the DAR rate by a factor 3 as dataset resolutions approach $512^3$. Colossal datasets will offer even more potential for acceleration benefits resulting from the present invention.

TABLE 1

Simulation Results for a Single Pipeline Operating at 100 M Hz

| | | | 256 × 256 × 128 | | | |
|---|---|---|---|---|---|---|
| | | | CT-head (Bone | | $256^3$ | |
| Dataset Size Voxel-block (Hz) | $64^3$ Synthetic High-opacity (Hz) | $128^3$ MRI-head High-opacity (Hz) | high-opacity, tissue semitransparent) (Hz) | CT-engine Semi-transparent (Hz) | MRI-head High-opacity (Hz) | CT-head (Bone high-opacity, tissue semitransparent) (Hz) |
| Data Access Rate | 381.47 | 47.68 | 11.92 | 11.92 | 5.96 | 5.96 |
| $4^3$ | 243.44 ± 106.70 | 44.34 ± 18.70 | 10.01 ± 4.89 | 7.50 ± 2.71 | 7.32 ± 3.14 | 3.39 ± 1.54 |
| $8^3$ | 403.08 ± 59.95 | 84.28 ± 16.71 | 19.27 ± 4.07 | 17.46 ± 2.69 | 13.82 ± 2.73 | 8.81 ± 1.62 |
| $16^3$ | 381.23 ± 0.28 | 66.20 ± 1.17 | 15.78 ± 0.55 | 16.40 ± 0.31 | 10.39 ± 0.34 | 9.33 ± 0.26 |
| $32^3$ | 381.46 ± 0.00 | 47.67 ± 0.02 | 12.81 ± 0.10 | 12.11 ± 0.10 | 6.41 ± 0.04 | 7.93 ± 0.04 |

A $256^3$ MRI dataset with multiple resample and composite engine processors for parallel and perspective projections was also simulated. As expected, perspective projections delivered less performance due to a slight increase in the amount of voxel refetch. By using $8^3$–$16^3$ voxel-blocks, 20 Hz (15 Hz) performance was obtained for a $256^3$×16-bit dataset using only $$400\ \frac{\text{MByte}}{\text{second}}$$

(i.e., two 100 MHz processors) of volume memory throughput and two resample and composite engines for parallel (perspective) projections. Extrapolating these results to a $512^3$ dataset, the resample and composite engine architecture requires only $$3.2\ \frac{\text{GByte}}{\text{second}}$$

of volume memory throughput for similar frame rates. Larger algorithmic speedups are expected when the dataset resolution is increased. As a result, the resample and composite engine allows next generation size datasets to be rendered interactively using similar volume memory throughput that other solutions currently use to render smaller datasets. For example, texture mapping engines offer less than 10 Hz for $256^3$ datasets using more than $$3.2\ \frac{\text{GByte}}{\text{second}}$$

of volume memory throughput. The VG-engine and VIZARD II approaches will require approximately $$2\ \frac{\text{GByte}}{\text{second}}$$

bandwidth for similar performance on a smaller dataset. In the RACE architecture, $16^3$ voxel-blocks offer the best combination of scalability and performance when the pixel-bus and voxel-bus operate at the same clock frequency.

Various changes to the foregoing described and shown methods and corresponding structures would now be evident to those skilled in the art. The matter set forth in the foregoing description and accompanying figures is therefore offered by way of illustration only and not as a limitation. Accordingly, the particularly disclosed scope of the invention is set forth in the following claims.

What is claimed is:

1. A digital electronic system for real-time volume rendering of a 3D volume dataset comprising:

a data-processing accelerator for reducing a number of voxels for rendering an image in real-time by selecting image-forming voxels that are non-transparent and non-occluded from a projection and by rejecting non-image-forming voxels that are transparent or occluded from the projection, wherein the voxels are a volume dataset of the image to be rendered contained in memory external to the system;

a control unit for forward projecting the 3D volume dataset at regularly spaced voxel positions to determine number of rays to be casted wherein said 3D volume dataset is divided into a plurality of voxel access blocks having a cubic array of voxel;

a processor for ray casting the rays of the image-forming voxels in a front-to-back order to form 2D representation of image planes;

a hardware engine for accelerating the real-time volume rendering by having the image-forming voxels available for processing without having to refetch a substantial number of the voxels from the external memory;

wherein the real-time image is rendered from the image-planes formed from the selected voxels.

2. The system of claim 1 wherein the projection is a parallel projection.

3. The system of claim 1 wherein the projection is a perspective projection.

4. The system of claim 1 wherein the projection is a stereoscopic projection.

5. The system of claim 1 wherein the ray casting includes early-ray termination and space leaping for selecting the image-forming voxels, wherein the image-forming voxels are non-occluded voxels and early-ray termination substantially avoids oversampling of the occluded voxels.

6. The system of claim 1 wherein ray casting includes space leaping for selecting the image-forming voxels, wherein the image-forming voxels are non-transparent voxels and space leaping substantially avoids overprocessing of transparent voxels.

7. The system of claim 1 wherein the hardware engine further comprises volume memory for storing a local copy of a small subset of the data volume defining the voxels, a rendering unit for implementing the ray casting of the stored data volume and pixel memory for storing output ray data from the rendering unit from which the real time image is to be rendered.

8. The system of claim 1 wherein the hardware engine includes at least two processors and a controller synchronizes the processors.

9. The system of claim 8 wherein the data volume of neighboring voxels is distributed between the at least two processors.

10. The system of claim 9 wherein data volume from one processor is distributed in a circular fashion to the other processor for interpolating image-cast rays.

11. The system of claim 10 wherein the volume memory is a high-speed internal static or dynamic random access memory and each processor has a dedicated connection the high-speed internal static or dynamic random access memory.

12. The system of claim 11 wherein the image can be rendered from the hardware engine faster than all of the voxels in the volume dataset can be read from the external memory.

13. The system of claim 1 further comprising a personal computer containing the external memory.

14. The system of claim 1 further comprising a screen for viewing the rendered real-time image.

15. A method for rendering a real-time image comprising:

retrieving a volume dataset from external memory;

subdividing the volume dataset into a plurality of voxel access blocks, wherein said voxel access blocks are a cubic array of voxels;

storing the voxel access blocks in high-speed internal memory;

forward projecting the voxels located at the corners of the block to determine number of rays to be casted, wherein said corner voxels correspond to a position of said block;

ray casting the rays in a front-to-back order to form a two-dimensional representation therefrom;

reducing a number of the voxels for rendering an image in real-time by selecting non-transparent voxels and non-occluded voxels and by rejecting transparent voxels or occluded voxels wherein the voxels are the volume dataset of the image to be rendered contained in said external memory;

processing the selected voxels to form pixels in a plurality of processors having interleaved memories for processing and distributing the voxels thereamong without having to refetch the voxels from the external memory; and rendering a real-time image therefrom.

16. The method of claim 5 further including wherein the step of reducing the number of voxels further includes early-ray termination for selecting the non-occluded voxels to substantially avoid oversampling of occluded rays.

17. The method of claim 16 wherein the step of reducing the number of voxels further includes space-leaping to substantially avoid the overprocessing of the transparent voxels.

18. The method of claim 16 further including processing the pixels and the voxels in high-speed internal random access memory to render the image therefrom faster than the step of retrieving the volume data set from the external memory.

19. A method for rendering a real-time image comprising:

retrieving a volume dataset from external memory;

forward projecting the volume dataset at regularly spaced voxel positions to compute number of rays/pixels to be casted, wherein the dataset is divided into plurality of voxel access blocks having cubic array of voxels;

ray casting the rays/pixels in front-to-back order visiting all voxel access blocks except for transparent or occluded blocks without having to refetch the voxels from the external memory to form a 2D representation of image planes, wherein said image planes is a calculation of color, opacity and position of the rays/pixels.

*20. A method for rendering a real-time image comprising:*

*retrieving a volume dataset from external memory;*

*subdividing the volume dataset into a plurality of voxel access blocks;*

*storing the voxel access blocks in high-speed internal memory;*

*forward projecting the voxels located at the corners of the block to determine number of rays to be casted, wherein said corner voxels correspond to a position of said block;*

*ray casting the rays in a front-to-back order to form a two-dimensional representation therefrom;*

*reducing a number of the voxels for rendering an image in real-time by selecting non-transparent voxels and non-occluded voxels and by rejecting transparent voxels or occluded voxels wherein the voxels are the volume dataset of the image to be rendered contained in said external memory;*

*processing the selected voxels to form pixels in a plurality of processors having interleaved memories for processing and distributing the voxels thereamong without having to refetch the voxels from the external memory; and*

*rendering a real-time image therefrom.*

*21. A system for rendering a volume dataset, wherein the volume dataset includes a plurality of voxel blocks, wherein each of said voxel blocks includes two or more voxels, the system comprising:*

*one or more rendering units;*

*a first memory configured to store said plurality of voxel blocks;*

*a control unit, wherein, for each of said plurality of voxel blocks, said control unit is configured to:*

*identify, by performing a forward projection, a portion of a frame buffer corresponding to the voxel block;*

*determine whether the voxel block is selected for transfer from said first memory to said one or more rendering units, wherein said determination is based upon whether said voxel block is transparent and whether said voxel block is occluded relative to a current viewing position; and*

*transfer the voxel block from the first memory to said one or more rendering units in response to said determination indicating that the voxel block is selected for transfer;*

*wherein, for each voxel block, said one or more rendering units are configured to process, in front-to-back order, a set of rays passing through the corresponding portion of the frame buffer, and wherein said one or more rendering units are configured to terminate processing of rays determined to be occluded.*

*22. The system of claim 21, wherein the control unit is configured to perform said identification according to a front to back ordering of the voxel blocks.*

*23. The system of claim 21, wherein said performing the forward projection is based on a parallel projection, a perspective projection, or a stereoscopic projection.*

*24. The system of claim 21, wherein a first of the one or more rendering units is configured to determine whether a ray is occluded by comparing an opacity value of the ray to an opacity threshold.*

*25. The system of claim 21, wherein a first of the one or more rendering units is configured to perform space leaping on at least one of the rays of the set of rays in response to an indication that a current one of the voxel blocks and voxel blocks neighboring the current voxel block are transparent.*

*26. The system of claim 21, wherein the first memory comprises one or more volume memories coupled respectively to the one or more rendering units, wherein the plurality of voxels are partitioned among the one or more volume memories.*

*27. The system of claim 26, wherein each of the voxel blocks is partitioned among the one or more volume memories.*

*28. The system of claim 27, wherein each of the one or more rendering units is configured for circular distribution of voxels among the one or more rendering units.*

*29. The system of claim 21, wherein the frame buffer is partitioned among one or more pixel memories coupled respectively to the one or more rendering units.*

*30. The system of claim 29, wherein the control unit is further configured to transfer blocks of rays between the frame buffer and the one or more rendering units.*

*31. The system of claim 30, wherein the rays of each block of rays is distributed among the one or more pixel memories so that each of the one or more rendering units processes a corresponding portion of the rays in each block of rays.*

*32. The system of claim 21, wherein the one or more rendering units are configured to interpolate samples along the rays of said set of rays based on voxels of the transferred voxel block.*

*33. The system of claim 21, wherein a first of the one or more rendering units is configured to compute gradients from voxels of the transferred voxel block.*

*34. The system of claim 21 further comprising a personal computer containing the first memory.*

35. The system of claim 21 further comprising a screen for viewing an image stored in the frame buffer.

36. The system of claim 21, where the frame buffer represents a rendered image of the volume dataset.

37. The system of claim 21, wherein, for each of the voxel blocks, the control unit is configured to issue blocks of rays to the one or more rendering units starting from a center of said portion of the frame buffer.

38. The system of claim 21, wherein a first of the one or more rendering units includes a ray caster unit, wherein the ray caster unit is configured to operate on rays by performing calculations including one or more of the following types of calculations: reconstruction, classification, shading, composition.

39. The system of claim 38, wherein the ray caster unit is configured to perform composition calculations, and wherein the first rendering unit further includes a ray interleave unit configured to interleave rays of said set of rays in order to prevent feedback in said composition calculations performed in the ray caster unit.

40. The system of claim 21, wherein the volume dataset is a computed tomography (CT) dataset or a magnetic resonance imaging (MRI) dataset.

41. The system of claim 21, wherein the volume dataset represents geophysical information.

42. The system of claim 21, wherein the volume dataset describes one or more properties of a fluid or of a chemical system.

43. The system of claim 21, wherein the system is a 3D graphics system.

44. The system of claim 21, wherein the system is a computer aided design (CAD) system.

45. The system of claim 21, wherein said determination includes determining that the voxel block is not selected for transfer based on information indicating that the voxel block is occluded relative to the current viewing position.

46. The system of claim 21, wherein said determination includes determining that the voxel block is selected for transfer based on information indicating that the voxel block is not occluded relative to the current viewing position and information indicating that the voxel block is not transparent.

47. The system of claim 21, wherein said determination includes determining that the voxel block is selected for transfer based on information indicating that said voxel block is transparent, information indicating that the voxel block is not occluded relative to a current viewing position, and information indicating that neighboring voxel blocks of said voxel block are transparent.

48. A system for rendering a volume dataset, wherein the volume dataset includes a plurality of voxel blocks, wherein each of said voxel blocks includes two or more voxels, the system comprising:

one or more rendering means for performing rendering computations;

a first means for storing said plurality of voxel blocks;

a control means for:

identifying, by performing a forward projection, a portion of a frame buffer corresponding to each of the voxel blocks;

determining whether the voxel block is selected for transfer from said first means to said one or more rendering means, wherein said determination is based upon whether said voxel block is transparent and whether said voxel block is occluded relative to a current viewing position; and transferring the voxel block from the first means to said one or more rendering means in response to said determination indicating that the voxel block is selected for transfer;

wherein said one or more rendering means comprise means for:

processing, in a front-to-back order, a set of rays passing through the portion of the frame buffer, and terminating the processing of rays determined to be occluded.

49. The system of claim 48, wherein a first of said one or more rendering means includes a first buffer for buffering two slices of voxels.

50. The system of claim 49, wherein the first rendering means includes a second buffer for buffering one slice of gradient data.

51. The system of claim 48, where the frame buffer is configured to store data representing a two-dimensional array of pixels, wherein each pixel defines a corresponding ray relative to the viewing position, wherein the stored data for each pixel includes a color, an opacity and a position.

52. The system of claim 51, wherein the stored data for each pixel also includes an increment vector.

53. The system of claim 48, wherein said determination includes determining that the voxel block is not selected for transfer based on information indicating that the voxel block is occluded relative to the current viewing position.

54. The system of claim 48, wherein said determination includes determining that the voxel block is selected for transfer based on information indicating that the voxel block is not occluded relative to the current viewing position and information indicating that the voxel block is not transparent.

55. The system of claim 48, wherein said determination includes determining that the voxel block is selected for transfer based on: information indicating that said voxel block is transparent, information indicating that the voxel block is not occluded relative to a current viewing position, and information indicating that neighboring voxel blocks of said voxel block are transparent.

56. A method for rendering a volume dataset, wherein the volume dataset includes a plurality of voxel blocks, wherein each of said voxel blocks includes two or more voxels, the method comprising:

a computer system storing the plurality of voxels in a first memory;

for each of the voxel blocks:

the computer system identifying, by performing a forward projection, a portion of a frame buffer corresponding to the voxel block;

the computer system determining whether the voxel block is selected for retrieval from said first memory, wherein said determining is based upon whether said voxel block is transparent and whether said voxel block is occluded relative to a current viewing position; and the computer system retrieving the voxel block from the first memory in response to said determination indicating that the voxel block is selected for retrieval;

processing, in front-to-back order, a set of rays passing through the corresponding portion of the frame buffer; and the computer system terminating processing of rays determined to be occluded.

57. The method of claim 56, wherein each of the voxel blocks is retrieved from the first memory at most once per frame.

*58. The method of claim 56, wherein said identifying the portion of a frame buffer corresponding to each of said voxel blocks is performed according to a front-to-back ordering of the voxel blocks.*

*59. The method of claim 56 further comprising:*

*displaying an image from the frame buffer.*

*60. The method of claim 56 further comprising:*

*determining that a ray is occluded by comparing an opacity value of the ray to an opacity threshold.*

*61. The method of claim 56 further comprising:*

*performing space leaping on at least one of the rays of said set of rays in response to a determination that the voxel block and a plurality of neighboring voxel blocks are transparent.*

*62. The method of claim 56, wherein said determining includes determining that the voxel block is not selected for retrieval based on information indicating that the voxel block is occluded relative to the current viewing position.*

*63. The method of claim 56, wherein said determining includes determining that the voxel block is selected for retrieval based on information indicating that the voxel block is not occluded relative to the current viewing position and information indicating that the voxel block is not transparent.*

*64. The method of claim 56, wherein said determining includes determining that the voxel block is selected for retrieval based on information indicating that said voxel block is transparent, information indicating that the voxel block is not occluded relative to a current viewing position, and information indicating that neighboring voxel blocks of said voxel block are transparent.*

*65. A volume rendering controller configured to:*

*access stored information to determine whether a block of voxels is selected for retrieval from a memory, wherein said stored information includes at least information specifying whether said block is transparent and information specifying whether said block is occluded relative to a current viewing position;*

*determine, by performing a forward projection, a portion of a frame buffer corresponding to the block;*

*output a clipping region of the block;*

*control a transfer of the block from the memory onto a first bus in response to a determination that the block is selected for retrieval.*

*66. The volume rendering controller of claim 65 further configured to:*

*control a transfer of pixel tiles in the corresponding portion of the frame buffer onto a second bus.*

*67. The volume rendering controller of claim 65 further configured to:*

*generate a space-leap flag for the block based on an examination of said information, wherein the space-leap flag indicates whether space-leaping is to be performed on one or more rays associated with said portion of the frame buffer; and*

*output the space leaping flag for the block.*

*68. The volume rendering controller of claim 65, wherein the volume rendering controller is further configured to determine that the block is not selected for retrieval based on the information indicating that the block is occluded relative to the current viewing position.*

*69. The volume rendering controller of claim 65, wherein the volume rendering controller is further configured to determine that the block is selected for retrieval based on the information indicating that the block is not occluded relative to the current viewing position and the information indicating that the block is not transparent.*

*70. The volume rendering controller of claim 65, wherein the volume rendering controller is further configured to determine that the block is selected for retrieval based on: the information indicating that said block is transparent, the information indicating that the block is not occluded relative to a current viewing position, and additional information indicating that blocks of voxels neighboring said block are transparent.*

*71. A method comprising:*

*accessing stored information to determine whether a block of voxels is selected for retrieval from a memory, wherein said stored information includes at least information specifying whether said block is transparent and information specifying whether said block is occluded relative to a current viewing position;*

*determining, by performing a forward projection, a portion of a frame buffer corresponding to the block;*

*outputting a clipping region of the block;*

*controlling a transfer of the block from the memory onto a first bus in response to a determination that the block is selected for retrieval.*

*72. The method of claim 71 further comprising:*

*controlling a transfer of pixel tiles in the corresponding portion of the frame buffer onto a second bus.*

*73. The method of claim 71 further comprising:*

*generating a space-leap flag for the block based on an examination of said information, wherein the space-leap flag indicates whether space-leaping is to be performed on one or more rays associated with said portion of the frame buffer; and*

*outputting the space leaping flag for the block.*

*74. The method of claim 71 further comprising:*

*determining that the block is not selected for retrieval based on the information indicating that the block is occluded relative to the current viewing position.*

*75. The method of claim 71 further comprising:*

*determining that the block is selected for retrieval based on the information indicating that the block is not occluded relative to the current viewing position and the information indicating that the block is not transparent.*

*76. The method of claim 71 further comprising:*

*determining that the block is selected for retrieval based on: the information indicating that said block is transparent, the information indicating that the block is not occluded relative to a current viewing position, and additional information indicating that blocks of voxels neighboring said block are transparent.*

*77. A medical imaging system for rendering a volume dataset, wherein the volume dataset includes a plurality of voxel blocks, wherein each of said voxel blocks includes two or more voxels, the system comprising:*

*one or more rendering units;*

*a first memory configured to store said plurality of voxel blocks;*

*a control unit, wherein, for each of said plurality of voxel blocks, said control unit is configured to:*

*identify, by performing a forward projection, a portion of a frame buffer corresponding to the voxel block;*

*determine whether the voxel block is selected for transfer from said first memory to the one or more rendering units, wherein said determination is based upon whether said voxel block is transparent and whether said voxel block is occluded relative to a current viewing position; and*

*transfer the voxel block from the first memory to said one or more rendering units in response to said determination indicating that the voxel block is selected for transfer;*

*wherein, for each voxel block, said one or more rendering units are configured to process, in front-to-back order, a set of rays passing through the corresponding portion of the frame buffer, and wherein the one or more rendering units are configured to terminate processing of rays determined to be occluded.*

*78. The medical imaging system of claim 77, wherein the volume dataset is a medical information dataset.*

*79. The medical imaging system of claim 77, wherein said determination includes determining that the voxel block is not selected for transfer based on information indicating that the voxel block is occluded relative to the current viewing position.*

*80. The medical imaging system of claim 77, wherein said determination includes determining that the voxel block is selected for transfer based on information indicating that the voxel block is not occluded relative to the current viewing position and information indicating that the voxel block is not transparent.*

*81. The medical imaging system of claim 77, wherein said determination includes determining that the voxel block is selected for transfer based on: information indicating that said voxel block is transparent, information indicating that the voxel block is not occluded relative to a current viewing position, and information indicating that neighboring voxel blocks of said voxel block are transparent.*

*82. A system for rendering a volume dataset, wherein the volume dataset includes a plurality of voxel blocks, wherein each of said voxel blocks includes an array of voxels, the system comprising:*

*a plurality of rendering units;*

*a first memory configured to store said plurality of voxel blocks;*

*a control unit, wherein, for each of said plurality of voxel blocks, said control unit is configured to:*

*identify, by performing a forward projection, a portion of a frame buffer corresponding to the voxel block;*

*determine whether the voxel block is selected for transfer from said first memory to at least one of the plurality of rendering units, wherein said determination is based upon information regarding whether said voxel block is transparent and information regarding whether said voxel block is occluded relative to a current viewing position; and*

*transfer the voxel block from the first memory to said at least one rendering unit in response to said determination indicating that the voxel block is selected for transfer;*

*wherein, for each voxel block, said at least one rendering unit is configured to process, in front-to-back order, a set of rays passing through the corresponding portion of the frame buffer, and wherein said at least one rendering unit is configured to perform early ray termination on rays determined to be occluded.*

*83. The system of claim 82, wherein the control unit is configured to perform said identification of the portion of the frame buffer corresponding to each of said voxel blocks according to a front-to-back ordering of the voxel blocks.*

*84. The system of claim 82, wherein the at least one rendering unit is configured to determine that a ray is occluded by comparing an opacity value of the ray to an opacity threshold.*

*85. The system of claim 82, wherein the at least one rendering unit is configured to perform space leaping on at least one of the rays of the set of rays in response to an indication that a current one of the voxel blocks is transparent.*

*86. The system of claim 82, wherein the at least one rendering unit is configured to interpolate samples along one or more of the rays of said set of rays based on voxels of the transferred voxel block.*

*87. The system of claim 82, wherein the array of voxels is a rectangular array.*

*88. The system of claim 82, wherein the array of voxels is a cubic array.*

*89. The system of claim 82, wherein said determination includes determining that the voxel block is not selected for transfer based on information indicating that the voxel block is occluded relative to the current viewing position.*

*90. The system of claim 82, wherein said determination includes determining that the voxel block is selected for transfer based on information indicating that the voxel block is not occluded relative to the current viewing position and information indicating that the voxel block is not transparent.*

*91. The system of claim 82, wherein said determination includes determining that the voxel block is selected for transfer based on: information indicating that said voxel block is transparent, information indicating that the voxel block is not occluded relative to a current viewing position, and information indicating that neighboring voxel blocks of said voxel block are transparent.*

* * * * *

UNITED STATES PATENT AND TRADEMARK OFFICE

CERTIFICATE OF CORRECTION

PATENT NO. : RE42,638 E
APPLICATION NO. : 11/305902
DATED : August 23, 2011
INVENTOR(S) : Ray et al.

It is certified that error appears in the above-identified patent and that said Letters Patent is hereby corrected as shown below:

Title Page, item (73), under "Assignee", in Column 1, Line 2, delete "JerseyNJ (US)" and insert -- Jersey NJ (US) --.

Column 19, line 17, in Claim 16, delete "claim 5" and insert -- claim 15 --.

Column 19, line 48, in Claim 20, delete "*determine number*" and insert -- *determine a number* --.

Column 20, lines 25-26, in Claim 22, delete "*front to back*" and insert -- *front-to-back* --.

Column 20, line 56, in Claim 31, delete "*rays is*" and insert -- *rays are* --.

Column 21, line 62, in Claim 48, delete "*whether the voxel*" and insert -- *whether a voxel* --.

Column 23, lines 59-60, in Claim 68, delete "*the information*" and insert -- *information* --.

Column 23, lines 64-65, in Claim 69, delete "*the information*" and insert -- *information* --.

Column 23, line 66, in Claim 69, delete "*the information*" and insert -- *information* --.

Column 24, lines 3-4, in Claim 70, delete "*the information*" and insert -- *information* --.

Column 24, lines 4-5, in Claim 70, delete "*the information*" and insert -- *information* --.

Column 24, line 36, in Claim 74, delete "*the information*" and insert -- *information* --.

Column 24, line 40, in Claim 75, delete "*the information*" and insert -- *information* --.

Column 24, lines 41-42, in Claim 75, delete "*the information*" and insert -- *information* --.

Column 24, line 45, in Claim 76, delete "*the information*" and insert -- *information* --.

Column 24, line 46, in Claim 76, delete "*the information*" and insert -- *information* --.

Signed and Sealed this
Fifteenth Day of May, 2012

David J. Kappos

David J. Kappos
*Director of the United States Patent and Trademark Office*